United States Patent
Wu

(10) Patent No.: US 12,389,243 B2
(45) Date of Patent: Aug. 12, 2025

(54) MOBILE TERMINAL TESTING DEVICE AND MOBILE TERMINAL TESTING METHOD

(71) Applicant: ANRITSU CORPORATION, Kanagawa (JP)

(72) Inventor: Zhihui Wu, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 371 days.

(21) Appl. No.: 18/297,189

(22) Filed: Apr. 7, 2023

(65) Prior Publication Data

US 2023/0370874 A1 Nov. 16, 2023

(30) Foreign Application Priority Data

May 12, 2022 (JP) .................................. 2022-079062

(51) Int. Cl.
*H04W 24/06* (2009.01)
*H04B 17/00* (2015.01)
*H04B 17/29* (2015.01)

(52) U.S. Cl.
CPC ........ *H04W 24/06* (2013.01); *H04B 17/0085* (2013.01); *H04B 17/29* (2015.01)

(58) Field of Classification Search
CPC .... H04W 24/06; H04B 17/0085; H04B 17/29
USPC ....................................................... 455/423
See application file for complete search history.

(56) References Cited

U.S. PATENT DOCUMENTS

| 11,251,879 B1 | 2/2022 | Wu et al. | |
|---|---|---|---|
| 2014/0036715 A1* | 2/2014 | Chung | H04W 52/20 370/252 |
| 2020/0205018 A1* | 6/2020 | Chinbe | H04W 24/06 |
| 2021/0243621 A1* | 8/2021 | Kano | H04W 24/06 |
| 2022/0038197 A1* | 2/2022 | Endo | H04B 17/0085 |
| 2022/0236316 A1* | 7/2022 | Nakamura | H04B 17/21 |

FOREIGN PATENT DOCUMENTS

JP 2022-054744 A 4/2022

OTHER PUBLICATIONS 7.3.2 of 3GPP (registered trademark) Technical Specification Chapter 38.521-2.

* cited by examiner

*Primary Examiner* — Don N Vo
(74) *Attorney, Agent, or Firm* — McDonald Hopkins LLC

(57) ABSTRACT

A reception sensitivity test control unit 18 provided in a measurement device 1 and configured to execute a reception sensitivity test by repeatedly transmitting and receiving a test signal to a mobile terminal includes a test condition setting unit 18a that initially sets a test condition including an initial step level SL0 and a starting output level OL0 of the test signal at a start of the reception sensitivity test, and an AI prediction test condition change setting unit 18b that sets an AI prediction output level OL01, which is AI-predicted in advance by an AI prediction model based on the test condition set by the test condition setting unit 18a, as a first output level instead of the output level OL0.

7 Claims, 13 Drawing Sheets

| Measurement Step | Nonlinear Search (dBm) | Nonlinear Pass or Fail | AI Search (dBm) | AI Pass or Fail | Comment |
|---|---|---|---|---|---|
| 1 | −80 | Pass | −95.9 | Fail | Shaded marker is result of EIS Search. ※ Error control is 0.2. |
| 2 | −90 | Pass | −95.8 | Pass | |
| 3 | −95 | Pass | | | |
| 4 | −97.5 | Fail | | | |
| 5 | −96.2 | Fail | | | |
| 6 | −95.6 | Pass | | | |
| 7 | −95.9 | Fail | | | |
| 8 | −95.8 | Fail | | | |

FIG. 11

EISCDF Measurement Time Comparison
(Grid Type = Constant Step, Point = 168, Range = HEMIS, Step = 15 deg. & EL = 0.2dBm)

MOBILE TERMINAL TESTING DEVICE AND MOBILE TERMINAL TESTING METHOD

TECHNICAL FIELD

The present invention relates to a mobile terminal testing device and a mobile terminal testing method for performing a reception sensitivity test of receiving a test signal by a device under test and measuring reception sensitivity a plurality of times, and testing a mobile terminal which is the device under test.

BACKGROUND ART

For a wireless terminal that has been developed in recent years and transmits and receives a radio signal corresponding to IEEE802.11ad, 5G cellular, and the like, in which a signal in a wide band of a millimeter wave band is used, a performance test is performed of measuring an output level and reception sensitivity of a transmitted radio wave determined for each communication standard with respect to a wireless communication antenna included in the wireless terminal, and determining whether or not a predetermined reference is satisfied.

For example, in a performance test in which a wireless terminal for a 5G New Radio (NR) system (hereinafter, a 5G wireless terminal) is used as a Device Under Test (DUT), an OTA test is performed using an anechoic box (OTA chamber) called a Compact Antenna Test Range (CATR) which is not affected by a surrounding radio wave environment.

As an example of the OTA test, a DUT reception sensitivity test is provided in which an operation of receiving a test signal transmitted from a signal generator by a DUT (for example, 5G wireless terminal) to measure the reception sensitivity is performed a plurality of times, and aggregating measurement results. In the DUT reception sensitivity test, as disclosed in 7.3.2 of Chapter 38.521-2 of Non-Patent Document 1, there are regulations such as a minimum allowable output level [dB] of the test signal.

As a method for realizing the reception sensitivity test in which an operation of measuring DUT reception sensitivity is executed a plurality of times while sequentially lowering the output level of the test signal up to the minimum allowable output level, for example, there are known a method for sequentially changing (linearly changing) the output level of the test signal by a constant level as the number of measurements increases from a value set in a first reception sensitivity test, a method for non-linearly changing the output level of the test signal, and the like.

In addition, a method (in which a CP determination process is employed) is also known from the related art for setting a condition (CP condition) to be a check point (CP) and increasing the step level of the test signal in a case where a throughput measured during the test satisfies the CP condition, thereby shortening time until the measurement results are obtained (for example, refer to Patent Document 1).

RELATED ART DOCUMENT

Patent Document

[Non-Patent Document 1] 7.3.2 of 3GPP (registered trademark) Technical Specification Chapter 38.521-2
[Patent Document 1] JP-A-2022-54744

DISCLOSURE OF THE INVENTION

Problem that the Invention is to Solve

FIG. 15 shows examples of output level change patterns (EIS search path) until the end of the reception sensitivity test in the method for linearly changing the output level of the test signal and the method for non-linearly changing the output level of the test signal in the above-described mobile terminal testing device according to the related art. Here, EIS is an abbreviation for Equivalent Isotropic Sensitivity. As shown in FIG. 15, the method for linearly changing the output level of the test signal (refer to curves L1 and L2) and the method for non-linearly changing the output level of the test signal (refer to curves NL1 and NL2) are common in a fact that the EIS search starts from a first measurement OL (output) level which is a fixed value. In both the methods, there is a large gap between the first measurement OL level and the output levels of reception sensitivity test end positions (EIS points 1 and 2).

Therefore, in the mobile terminal measurement device according to the related art to which any of the above methods is applied, it is difficult to significantly shorten the EIS search time due to necessity to continue a significant number of EIS searches after setting the test signal to a first output level which is a fixed value and starting the EIS search.

On the other hand, in the device according to the related art, which employs the CP determination process disclosed in Patent Document 1, a width of change in the output level is large with the CP as a boundary, so that it is possible to shorten the EIS search time rather than the method for linearly or non-linearly changing the output level. In Patent Document 1, a graph of FIG. 11 shows a relationship between the output level and the number of measurements until the end of the reception sensitivity test in the method for non-linearly changing the output level of the test signal and the method for changing the output level through the CP determination process. In FIG. 11, a graph corresponding to a case of the non-linear change is denoted by reference numeral C3, and a graph corresponding to a case of the change through the CP determination process is denoted by reference numeral C1. As shown in FIG. 11, the method for changing the output level of the test signal through the CP determination process is employed, so that it is possible to reduce the number of measurements (up to four times in this example) compared to the method for non-linearly changing the output level, and, as a result, it is possible to shorten the EIS search time as many as the reduced number of measurements. However, even in the device according to the related art that employs the CP determination process, it is difficult to further reduce the number of measurements (the number of EIS searches) to a smaller number, so that there is a limit to shortening time of the EIS search time.

The present invention has been made to solve the problems according to the related art, and an object of the present invention is to provide a mobile terminal testing device and a mobile terminal testing method that can set an output level of a test signal to a testable level in shorter time by reducing the number of measurements as much as possible and can efficiently perform a reception sensitivity test of a mobile terminal.

Means for Solving the Problem

In order to solve the above problems, according to a first aspect of the present invention, there is provided a mobile terminal testing device (1), which includes a signal generator (20) that generates a test signal and a reception sensitivity test execution unit (18) that performs a reception sensitivity test of a mobile terminal (100) by transmitting and receiving the test signal a plurality of times between the signal generator and the mobile terminal, and tests the mobile terminal that is a device under test, the mobile terminal testing device (1) including setting means (18a) for initially setting a test condition including a step level SL0 and an output level OL0 of the test signal at start of the reception sensitivity test, pass or fail determination means (18f) for performing a throughput measurement by transmitting and receiving the test signal under the test condition and comparing a throughput measurement result with a determination threshold value to perform pass or fail determination, output level setting means (18e) for setting the output level according to a result of the pass or fail determination of a previous throughput measurement in a case where the result of the pass or fail determination is fail, and AI prediction test condition change setting means (18b) for holding an AI prediction model generated by performing machine learning on a relationship between parameter data and measurement result data from a measurement log file of the past reception sensitivity test using artificial intelligence, and setting an AI prediction output level OL01, which is AI-predicted in advance by the AI prediction model based on the test condition set by the setting means, as a first output level instead of the output level OL0.

With this configuration, in the mobile terminal testing device according to the first aspect of the present invention, it is possible to quickly set the first output level of the test signal to a value close to the end of the measurement with existing non-linear control or the like by AI prediction, and, it is possible to set the output level of the test signal to a testable level in an extremely short time by significantly reducing the number of measurements compared to methods according to the related art, such as non-linear control and CP control, and thus it is possible to efficiently perform the reception sensitivity test of the mobile terminal.

Further, in the mobile terminal testing device according to a second aspect of the present invention, the AI prediction test condition change setting means may set, instead of the step level SL0, an AI prediction step level SL01, which is AI-predicted in advance by the AI prediction model based on a measurement result of a first throughput measurement performed by transmitting and receiving the test signal at the AI prediction output level, as a step level for second and subsequent measurements.

With this configuration, the mobile terminal testing device according to the second aspect of the present invention dynamically controls not only the first output level of the test signal but also the step level by AI prediction. Therefore, compared to a case of continuing the measurement by the method according to the related art, such as the non-linear control and the CP control, it is possible to set the test signal to a testable level in a shorter time and it is possible to further improve the efficiency of the reception sensitivity test of the mobile terminal.

Further, in the mobile terminal testing device according to a third aspect of the present invention, the AI prediction test condition change setting means, in a case where a result of the pass or fail determination for the measurement result of the first throughput measurement is fail, thereafter, may perform an update process of the output level for a next measurement using the AI prediction step level SL01 until a second throughput measurement.

With this configuration, in the mobile terminal testing device according to the third aspect of the present invention, it is possible to avoid a situation in which the dynamic control described above is repeated uselessly even though the dynamic control of the first output level and the step level of the test signal by the AI prediction is limited to the second throughput measurement and the measurement starts from the value close to the end of the measurement in the non-linear control or the like.

Further, in the mobile terminal testing device according to a fourth aspect of the present invention, the AI prediction test condition change setting means may designate loss of an external connection cable, an azimuth angle (θ, φ) of the mobile terminal, and a frequency to be measured as the parameter data, and may hold the AI prediction model generated by performing the machine learning on the relationship between the parameter data and the measurement result data.

With this configuration, in the mobile terminal testing device according to the fourth aspect of the present invention, even in the environment in which each parameter data of the loss of the external connection cable, the azimuth angle (θ, φ) of the mobile terminal, and the frequency to be measured affects the measurement accuracy, it is possible to derive accurate AI prediction result to which each parameter data is added using the AI prediction model, and it is possible to set the test signal to a testable level in an extremely short time and reliably without dropping the measurement accuracy.

Further, in the mobile terminal testing device according to a fifth aspect of the present invention, the reception sensitivity test execution unit, in a case where a result of the pass or fail determination for measurement result of a second throughput measurement is fail, may control the output level setting means to perform a level down process A, a level down process B, a level up process A, or a level up process B.

With this configuration, in the mobile terminal testing device according to the fifth aspect of the present invention, in a case where the output level of the test signal does not reach the testable level through the dynamic control of the first output level and the step level of the test signal based on AI prediction, it is possible to immediately switch to a normal measurement routine and reliably set the output level of the test signal to the testable level.

Further, the mobile terminal testing device according to a sixth aspect of the present invention may further include an anechoic box (50) including an internal space (51); and scanning means (16, 56) for driving and scanning the mobile terminal to continuously vary an orientation of the mobile terminal in the internal space, in which the reception sensitivity test is performed in all orientations to be scanned by the scanning means in an over the air (OTA) measurement environment in the internal space.

With this configuration, in the mobile terminal testing device according to the sixth aspect of the present invention, even in a situation in which the reception sensitivity measurement should be performed in all orientations under the OTA environment, the dynamic control of the first output level and the step level of the test signal by the AI prediction is applied, so that it is possible to set the output level of the test signal to the testable level in a short time.

In order to solve the above problem, according to a seventh aspect of the present invention, there is provided a mobile terminal testing method for performing a reception sensitivity test of a mobile terminal by using a mobile terminal testing device (1), which includes a signal generator (20) that generates a test signal and a reception sensitivity test execution unit (18) that performs the reception sensitivity test of the mobile terminal by transmitting and receiving the test signal a plurality of times between the signal generator and the mobile terminal (100), and tests the mobile terminal that is a device under test, and by transmitting and receiving the test signal between the signal generator and the mobile terminal a plurality of times, the method including a setting step (S1) of initially setting a test condition including a step level SL0 and an output level OL of the test signal at start of the reception sensitivity test, an AI prediction test condition change setting step (S1a) of holding an AI prediction model generated by performing machine learning on a relationship between parameter data and measurement result data from a measurement log file of the past reception sensitivity test using artificial intelligence, and setting an AI prediction output level SL01, which is AI-predicted in advance by the AI prediction model based on the test condition set by the setting step, as a first output level instead of the output level OL0, a pass or fail determination step (S4, S5) of performing a first throughput measurement by transmitting and receiving the test signal at the AI prediction output level and comparing a first throughput measurement result with a determination threshold value to perform pass or fail determination, and a step level change setting step of setting, instead of the step level SL0, an AI prediction step level SL01, which is AI-predicted in advance by the AI prediction model based on a measurement result of the first throughput measurement, as a step level for second and subsequent measurements.

With this configuration, in the mobile terminal testing method according to the seventh aspect of the present invention, the mobile terminal testing method is applied by using the mobile terminal testing device having the signal generator that generates the test signal and the reception sensitivity test execution unit that performs the reception sensitivity test of the mobile terminal by transmitting and receiving the test signal a plurality of times between the signal generator and the mobile terminal, and testing the mobile terminal that is a device under test. Therefore, it is possible to quickly set the first output level of the test signal to a value close to the end of the measurement with existing non-linear control or the like by AI prediction, and, it is possible to set the output level of the test signal to a testable level in an extremely short time by significantly reducing the number of measurements compared to methods according to the related art, such as non-linear control and CP control, and thus it is possible to efficiently perform the reception sensitivity test of the mobile terminal.

Advantage of the Invention

The present invention can provide a mobile terminal testing device and a mobile terminal testing method that can set an output level of a test signal to a testable level in a shorter time by reducing the number of measurements as much as possible and can efficiently perform a reception sensitivity test of a mobile terminal.

BRIEF DESCRIPTION OF THE DRAWINGS

FIGS. 5A and 5B are diagrams showing total spherical scanning images of a device under test in an OTA chamber of the measurement device according to the embodiment of the present invention, in which FIG. 5A shows a disposition mode of the device under test with respect to a center of a spherical coordinate system, and FIG. 5B shows a distribution mode of angular sample points PS in the spherical coordinate system.

FIGS. 10A and 10B are flowcharts showing details of a process in step S8 of FIG. 9, in which FIG. 10A shows a level down process (A) and FIG. 10B shows a level down process (B).

FIG. 11 is a table showing the relationship between the number of measurements related to the reception sensitivity test of the DUT to which the AI prediction is applied in the measurement device according to the embodiment of the present invention and the reception sensitivity test of the DUT in the existing device, and the output level of the test signal and pass or fail determination result of the throughput measurement result.

BEST MODE FOR CARRYING OUT THE INVENTION

Hereinafter, embodiments of a mobile terminal testing device and a mobile terminal testing method according to the present invention will be described with reference to the accompanying drawings.

Figure 1:
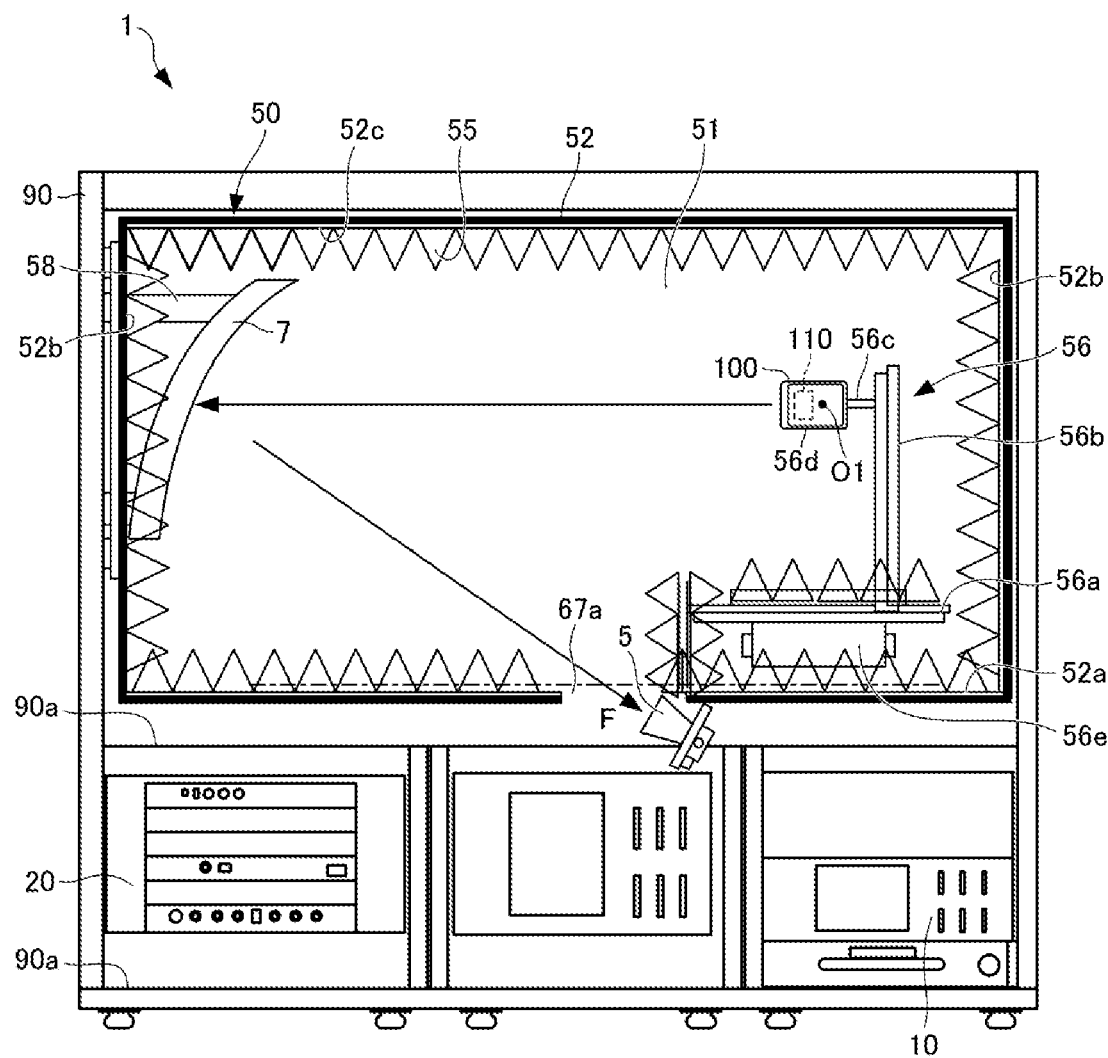
FIG. 1 is a diagram showing a schematic configuration of an entire measurement device according to an embodiment of the present invention.
Figure 2:
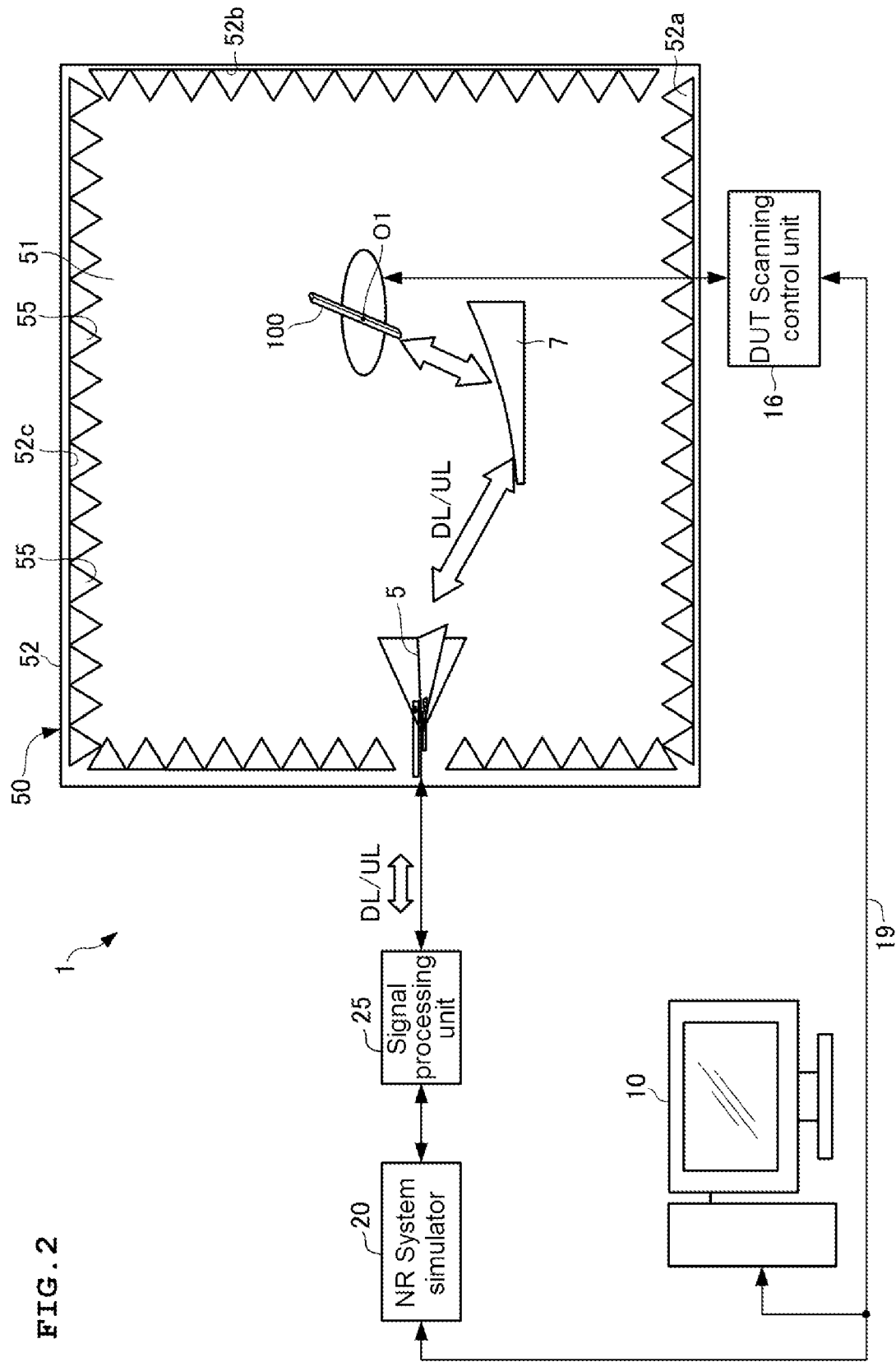
FIG. 2 is a block diagram showing a functional configuration of the measurement device according to the embodiment of the present invention.

First, a configuration of a measurement device 1 according to the embodiment of the present invention will be described with reference to FIGS. 1 to 4. The measurement device 1 constitutes the mobile terminal testing device of the present invention. The measurement device 1 according to the present embodiment has an external structure as shown in FIG. 1 as a whole, and includes functional blocks as shown in FIG. 2. FIGS. 1 and 2 show a disposition mode of each component of an OTA chamber 50 in a state of being seen through from a side surface thereof.

The measurement device 1 is operated, for example, in a mode in which each of the above-described components is mounted on each rack 90a of a rack structure 90 having the structure shown in FIG. 1. FIG. 1 shows an example in which each of an integrated control device 10, an NR system simulator 20, and an OTA chamber 50 is mounted on each rack 90a of the rack structure 90.

As shown in FIG. 2, the measurement device 1 according to the present embodiment includes the integrated control device 10, the NR system simulator 20, a signal processing unit 25, and the OTA chamber 50.

For the configuration, here, the OTA chamber 50 will be described first for convenience. As shown in FIGS. 1 and 2, the OTA chamber 50 includes, for example, a metal housing main body 52 having a rectangular internal space 51, and accommodates a DUT 100 having an antenna 110, a test antenna 5, a reflector 7, and a DUT scanning mechanism 56 in the internal space 51.

A radio wave absorber 55 is attached to a whole area of an inner surface of the OTA chamber 50, that is, a bottom surface 52a, a side surface 52b, and a top surface 52c of the housing main body 52. As a result, in the OTA chamber 50, each element (the DUT 100, the test antenna 5, the reflector 7, and the DUT scanning mechanism 56) disposed in the internal space 51 has an enhanced function of regulating intrusion of radio waves from the outside and radiation of the radio waves to the outside. In this way, the OTA chamber 50 realizes an anechoic box having the internal space 51 that is not affected by a surrounding radio wave environment. The anechoic box used in the present embodiment is, for example, an Anechoic type.

Among those accommodated in the internal space 51 of the OTA chamber 50, the DUT 100 is, for example, a wireless terminal such as a smartphone. Communication standards for the DUT 100 include cellular (LTE, LTE-A, W-CDMA (registered trademark), GSM (registered trademark), CDMA 2000, 1×EV-DO, TD-SCDMA, or the like), wireless LAN (IEEE 802.11b/g/a/n/ac/ad, or the like), Bluetooth (registered trademark), GNSS (GPS, Galileo, GLONASS, BeiDou, or the like), FM, and digital broadcasting (DVB-H, ISDB-T, or the like). Further, the DUT 100 may be a wireless terminal that transmits and receives a radio signal in a millimeter wave band corresponding to IEEE 802.11ad, 5G cellular, or the like.

In the present embodiment, the antenna 110 of the DUT 100 uses a radio signal in each regulated frequency band in conformity with, for example, 5G NR communication standard. The DUT 100 constitutes the device under test, that is, a mobile terminal in the present invention.

In the internal space 51 of the OTA chamber 50, the DUT 100 is held by a part of mechanism of the DUT scanning mechanism 56. The DUT scanning mechanism 56 is provided to extend in a vertical direction on the bottom surface 52a of the housing main body 52 in the internal space 51 of the OTA chamber 50. The DUT scanning mechanism 56 performs a total spherical scanning (refer to FIGS. 5A and 5B and FIG. 6), which will be described later, on the DUT 100 while holding the DUT 100 on which a performance test is performed.

As shown in FIG. 1, the DUT scanning mechanism 56 includes a turntable 56a, a support column member 56b, a DUT mounting portion 56c, and a drive unit 56e. The turntable 56a includes a plate member having a disk shape, and has a configuration (refer to FIG. 3) that rotates around an azimuth axis (a rotation axis in the vertical direction). The support column member 56b includes a columnar member disposed to extend in a direction perpendicular to a plate surface of the turntable 56a.

The DUT mounting portion 56c is disposed near an upper end of the support column member 56b to be in parallel with the turntable 56a, and has a mounting tray 56d on which the DUT 100 is mounted. The DUT mounting portion 56c has a configuration (refer to FIG. 3) capable of rotating around the roll axis (a rotation axis in a horizontal direction).

Figure 3:
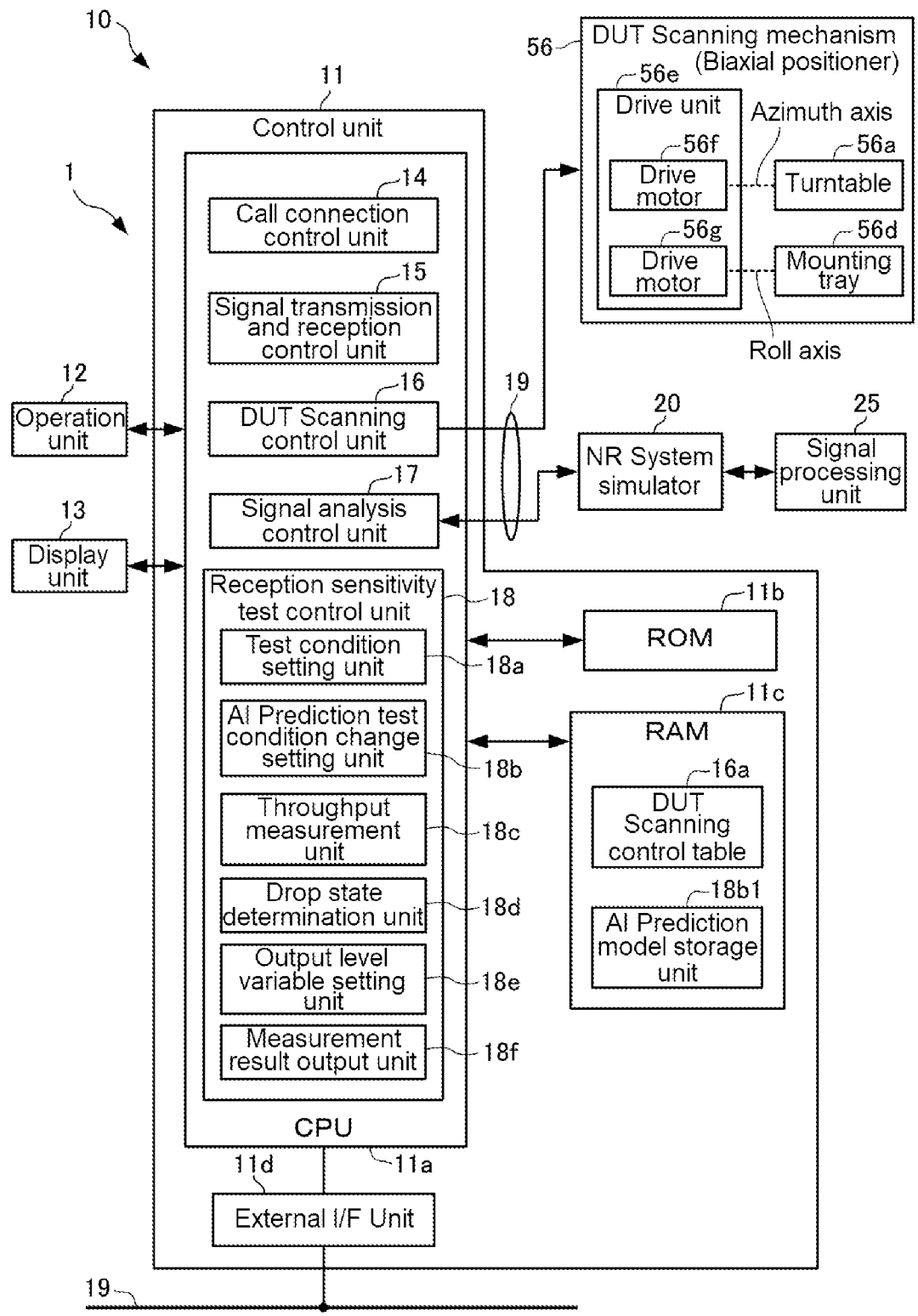
FIG. 3 is a block diagram showing functional configurations of an integrated control device of the measurement device and a controlled element thereof according to the embodiment of the present invention.

As shown in FIG. 3, the drive unit 56e includes, for example, a drive motor 56f that rotationally drives the azimuth axis, and a drive motor 56g that rotationally drives the roll axis. The drive unit 56e includes a biaxial positioner provided with a mechanism for rotating the azimuth axis and the roll axis in respective rotation direction thereof by the drive motor 56f and the drive motor 56g. In this way, the drive unit 56e can rotate the DUT 100 mounted on the mounting tray 56d in biaxial (the azimuth axis and the roll axis) directions for each mounting tray 56d. Hereinafter, there is a case where the entire DUT scanning mechanism 56 including the drive unit 56e is referred to as the biaxial positioner (refer to FIG. 3). Each of the drive unit 56e and the drive motors 56f and 56g constitutes drive means, first rotary drive means, and second rotary drive means in the present invention. The mounting tray 56d constitutes the device under test mounting portion in the present invention.

Figure 5A:
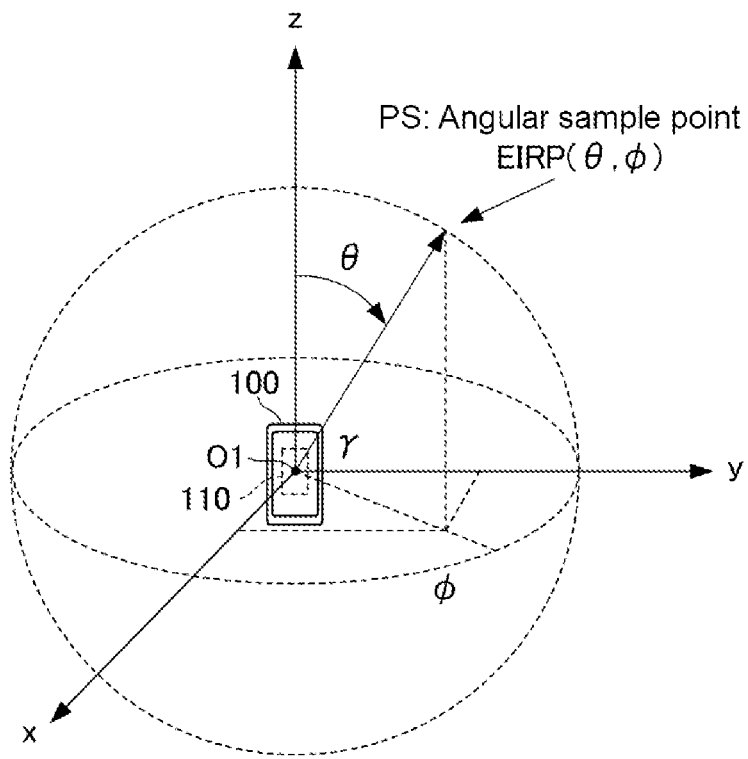
Figure 5B:
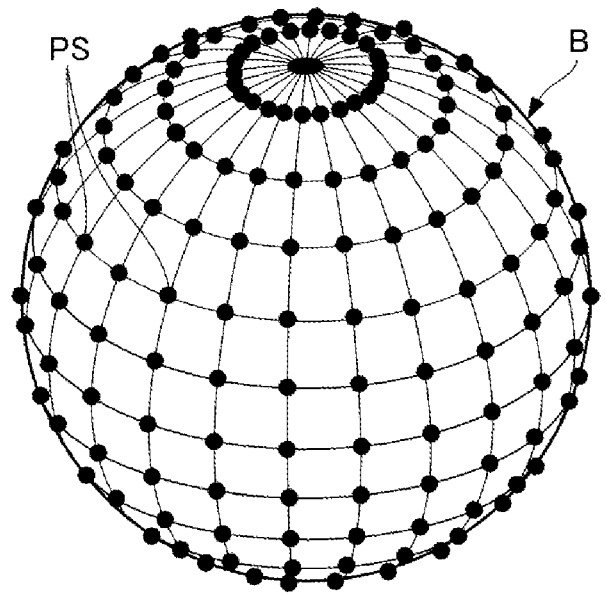

The DUT scanning mechanism 56 performs total spherical scanning which sequentially changes a posture of the DUT 100 to a state where the antenna 110 faces all orientations of a surface of the sphere while assuming that the DUT 100 mounted (held) on the mounting tray 56d is disposed, for example, at a center O1 of the sphere (refer to a sphere B in FIGS. 5A and 5B). Control of the DUT scanning in the DUT scanning mechanism 56 is performed by a DUT scanning control unit 16 which will be described later. The DUT scanning mechanism 56 and the DUT scanning control unit 16 constitute scanning means in the present invention.

The test antenna 5 is attached to a required position on the bottom surface 52a of the housing main body 52 of the OTA chamber 50 by using an appropriate holder (not shown). An attachment position of the test antenna 5 is a position at which visibility can be secured from the reflector 7 via an opening 67a provided on the bottom surface 52a. The test antenna 5 uses a radio signal in the frequency band of the same regulation (NR standard) as the antenna 110 of the DUT 100.

In a case where measurement related to the NR of the DUT 100 is performed in the OTA chamber 50, the test antenna 5 transmits a test signal from the NR system simulator 20 to the DUT 100 and receives a signal under measurement transmitted from the DUT 100 that has received the test signal. The test antenna 5 is disposed so that a light reception surface thereof becomes a focal position F of the reflector 7. The reflector 7 is not always required in a case where the test antenna 5 can be disposed so that the light reception surface thereof faces the DUT 100 and appropriate light reception can be performed.

The reflector 7 is attached to a required position on the side surface 52b of the OTA chamber 50 by using a reflector holder 58. The reflector 7 realizes a radio wave path that returns the radio signal (the test signal and the signal under measurement) transmitted and received by the antenna 110 of the DUT 100 to the light reception surface of the test antenna 5.

Subsequently, configurations of the integrated control device 10 and the NR system simulator 20 will be described.

As shown in FIG. 2, the integrated control device 10 is communicably connected to the NR system simulator 20 via a network 19 such as Ethernet (registered trademark). Further, the integrated control device 10 is also connected to a controlled system element in the OTA chamber 50, for example, the DUT scanning control unit 16 via the network 19.

The integrated control device 10 comprehensively controls the NR system simulator 20 and the DUT scanning control unit 16 via the network 19, and includes, for example, a Personal Computer (PC). The DUT scanning control unit 16 may be independently provided accompanying with the OTA chamber 50 (refer to FIG. 2), or may be provided in the integrated control device 10 as shown in FIG. 3. Hereinafter, description will be performed while assuming that the integrated control device 10 has the configuration shown in FIG. 3.

As shown in FIG. 3, the integrated control device 10 includes a control unit 11, an operation unit 12, and a display unit 13. The control unit 11 includes, for example, a computer device. The computer device includes a Central Processing Unit (CPU) 11a that performs predetermined information processing to realize the function of the measurement device 1, and performs comprehensive control on the NR system simulator 20, and the signal processing unit 25 as targets, a Read Only Memory (ROM) 11b that stores an Operating System (OS) for starting up the CPU 11a, the other programs, and control parameters, and the like, a Random Access Memory (RAM) 11c that stores execution code, data, and the like of the OS or an application which is used for an operation by the CPU 11a, an external I/F unit 11d, an input and output port (not shown), and the like.

The external I/F unit 11d is communicably connected to each of the NR system simulator 20, the signal processing unit 25, and the drive unit 56e of the DUT scanning mechanism (biaxial positioner) 56 via the network 19. An operation unit 12 and a display unit 13 are connected to the input and output port. The operation unit 12 is a functional unit for inputting various information such as commands, and the display unit 13 is a functional unit for displaying various information such as an input screen, measurement results, and the like of the various information.

The computer device described above functions as the control unit 11 in such a way that the CPU 11a executes a program stored in the ROM 11b while using the RAM 11c as a work area. As shown in FIG. 3, the control unit 11 includes a call connection control unit 14, a signal transmission and reception control unit 15, a DUT scanning control unit 16, a signal analysis control unit 17, and a reception sensitivity test control unit 18. The call connection control unit 14, the signal transmission and reception control unit 15, the DUT scanning control unit 16, the signal analysis control unit 17, and the reception sensitivity test control unit 18 are also realized by executing a predetermined program stored in the ROM 11b in the work area of the RAM 11c by the CPU 11a.

The call connection control unit 14 drives the test antenna 5 via the NR system simulator 20 and the signal processing unit 25 to transmit and receive a control signal (radio signal) to and from the DUT 100, thereby performing control to establish a call (a state where the radio signal can be transmitted and received) between the NR system simulator 20 and the DUT 100.

The signal transmission and reception control unit 15 performs a control of monitoring a user operation in the operation unit 12, transmitting a signal transmission command to the NR system simulator 20 after the call is established through call connection control, by being triggered with a predetermined measurement start operation related to the measurement of transmission and reception characteristics of the DUT 100 by the user, and transmitting the test signal from the NR system simulator 20 via the test antenna 5, and a control of transmitting a signal reception command and receiving the signal under measurement via the test antenna 5.

The DUT scanning control unit 16 drives and controls the drive motors 56f and 56g of the DUT scanning mechanism 56 to perform total spherical scanning of the DUT 100 mounted on the mounting tray 56d of the DUT mounting portion 56c. In order to realize the control, for example, a DUT scanning control table 16a is prepared in the ROM 11b in advance. The DUT scanning control table 16a stores, for example, coordinates of each angular sample point PS (refer to FIG. 5B) in the spherical coordinate system (refer to FIG. 5A) related to the total spherical scanning of the DUT 100, drive data of the drive motors 56f and 56g associated with the coordinates of each angular sample point PS, and control data associated with a stop time (measurement time) at each angular sample point PS. In a case where the drive motors 56f and 56g are, for example, stepping motors, for example, the number of drive pulses is stored as the drive data.

The DUT scanning control unit 16 expands the DUT scanning control table 16a into the work area of the RAM 11c, and drives and controls the drive motors 56f and 56g of the DUT scanning mechanism 56 based on the control data stored in the DUT scanning control table 16a. As a result, the total spherical scanning of the DUT 100 mounted on the DUT mounting portion 56c is performed. In the total spherical scanning, the antenna surface of the antenna 110 of the DUT 100 is stopped for a regulated time (the stop time) toward the angular sample point PS for each angular sample point PS in the spherical coordinate system, and, thereafter, an operation of moving to a next angular sample point PS (scanning of the DUT 100) is sequentially performed while targeting all the angular sample points PS.

The signal analysis control unit 17 captures a radio signal, which is related to the NR or the LTE received by the test antenna 5 in a case where the total spherical scanning of the DUT 100 is performed, via the NR system simulator 20 and the signal processing unit 25, and performs an analysis process (measurement process) on the radio signal as a signal of a designated measurement item.

The reception sensitivity test control unit 18 executes a reception sensitivity test of receiving the test signal, which is transmitted from the signal generation unit 21a of the NR system simulator 20, by the DUT 100 and measuring reception sensitivity a plurality of times, and performs control to aggregate measurement results of the reception sensitivity test, which is executed the plurality of times, as test results. The reception sensitivity test control unit 18 constitutes a reception sensitivity test execution unit and pass or fail determination means of the present invention.

As shown in FIG. 3, the reception sensitivity test control unit 18 includes a test condition setting unit 18a, an AI prediction test condition change setting unit 18b, a throughput measurement unit 18c, a drop state determination unit 18d, an output level variable setting unit 18e, and a measurement result output unit 18f. The test condition setting unit 18a, the AI prediction test condition change setting unit 18b, and the output level variable setting unit 18e respectively constitute setting means, test condition change setting means, and output level setting means of the present invention.

The test condition setting unit 18a is a functional unit for setting a test condition of the reception sensitivity test. The test condition (setting parameter) set by the test condition setting unit 18a includes an initial step level SL0, a starting output level OL0, an error tolerance level (error tolerance of boundary level) EL, a connection drop determination threshold value (connection drop threshold) DT, and the like. The initial step level SL0 indicates an initial value of a step fluctuation range of an output level of the test signal which is changed stepwise in a case of the reception sensitivity test. The starting output level OL0 indicates an output level of the DUT 100 (an output level in a case of first transmission and reception) in a case of starting the reception sensitivity test. The error tolerance level EL indicates the fluctuation range (predetermined value) between previous and current output levels of a test signal for determining whether or not to continue the reception sensitivity test on a next output level. The connection drop determination threshold value DT is a set value of a bottom value which causes drop of call connection (call drop) in case where a value is lower than the connection drop determination threshold value. In an algorithm shown in FIG. 9, the output level is lowered by a large step. Therefore, in a case where the process proceeds any further, call drop occurs, so that a threshold value which does not lower the output level is necessary. The value can be preset by the user.

The AI prediction test condition change setting unit 18b is a functional unit that uses an AI prediction model Dai (see FIG. 7) acquired by performing Machine Learning (ML) on relationship between parameter data and measurement result data from the measurement log files of the reception sensitivity test of the DUT 100 performed in the past in the measurement device 1 by the Artificial Intelligence (AI), and performs change setting on, instead of the initially set value, a specific setting parameter value which is AI-predicted in advance by the AI prediction model Dai based on the test condition (setting parameter) set (initially set) by the test condition setting unit 18a at the start of the test. The specific setting parameter subjected to change setting based on the AI prediction using the AI prediction model Dai by the AI prediction test condition change setting unit 18b includes, for example, an output level (starting output level OL0) and an initial step level SL0 of the initially set test signal. In the following (see FIG. 9), an example is provided in which change setting is performed based on the output levels OL0 and OL1 and the initial step level SL0 of the test signal until the second measurement based on AI prediction.

Figure 9:
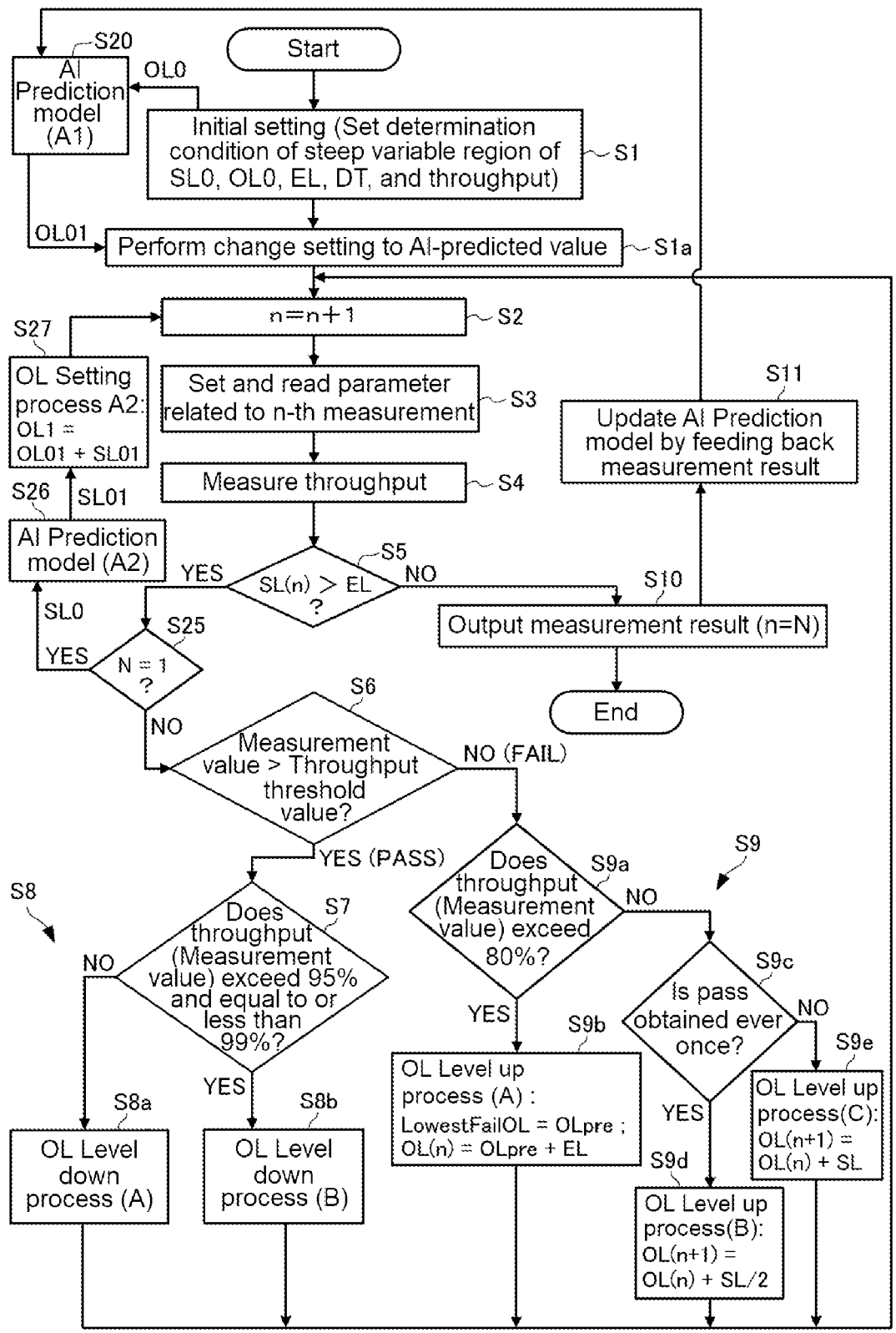
FIG. 9 is a flowchart showing a variable setting control operation of an output level of a test signal to which the AI prediction is applied in the reception sensitivity test of the DUT in the measurement device according to the embodiment of the present invention.

The change setting process of the initially set starting output level OL0 by the AI prediction test condition change setting unit 18b is performed, for example, in step S1a of the flowchart shown in FIG. 9, in the flow of searching for the AI prediction output level OL01 which is AI-predicted in advance by the AI prediction model Dai (AI prediction model A1), based on the test condition (setting parameter) initially set in previous step S1, and setting, instead of the starting output level OL0 initially set in step S1, the AI prediction output level OL01 as the first output level. In addition, the change setting process of the initial step level SL0 is performed in step S26 of the flowchart shown in FIG. 9 in the flow of setting, instead of the initial step level SL0 initially set in step S1, the AI prediction step level SL01 which is AI-predicted in advance by the AI prediction model Dai (AI prediction model A2) based on the processing results in previous steps S4, S5, and S25 (measurement results of the first throughput measurement when transmitting and receiving the test signal on which change setting is performed to the first output level in step S1a). A generation processing procedure of the AI prediction model Dai (A1, A2) will be described later in detail with reference to FIG. 7.

The throughput measurement unit 18c is a functional unit that measures a throughput related to reception capacity of the DUT 100 for each reception sensitivity test. For example, the throughput measurement unit 18c may be configured to transmit a transmission rate of the test signal to the DUT 100 in accordance with the transmission of the test signal, and, thereafter, to measure the throughput from the received transmission rate in accordance that the DUT 100 notifies the NR system simulator 20 of a reception result (received transmission rate) of the test signal.

The drop state determination unit 18d has a function of determining whether or not the throughput measurement result is in a dropped state to a preset proportion in the steep drop region related to the characteristic in which the throughput measurement result by the throughput measurement unit 18c drops steeply. In order to realize the function, for example, the test condition setting unit 18a presets a determination condition for determining whether or not the throughput measurement result drops to a certain proportion in the steep drop region. The drop state determination unit 18d determines whether or not the throughput measurement result is in the dropped state according to whether or not the measured throughput is in the steep drop region indicated by the determination condition. As the determination condition for determining whether or not the throughput measurement result is in the dropped state, for example, an example is provided in which a range which exceeds 95% and is equal to or less than 99% is set in a case where a value of the throughput, which is measured by the throughput measurement unit 18c through first test signal transmission and reception, is set to 100%. As a result, in a case where the measured throughput is in the set range, it is possible to determine the dropped state, and, in a case of a proportion higher than the range, it is possible to determine that the dropped state is not made (refer to steps S7 and S9a of FIG. 9). Here, the determination condition is not limited to a case where the value of the throughput, which is measured with the first test signal transmission and reception, is set to 100% (reference value) as described above and the range of the proportion, which exceeds 95% and is equal to or less than 99% with respect to the reference value, is set. Another range of a proportion with respect to the reference value may be set.

The output level variable setting unit 18e is a functional unit that performs variable setting, according to a comparison result between a throughput measurement result by the throughput measurement unit 18c and a predetermined threshold value (throughput threshold value) set in advance, so that an output level of a test signal in a next reception sensitivity test is in an ascending (level up) or descending (level down) direction, that is, the output levels of the test signals between the reception sensitivity tests corresponding to before and after number of times become different.

The measurement result output unit 18f is a functional unit that proceeds to the next reception sensitivity test (throughput measurement) in a case where a test result fluctuation range between a test result (throughput measurement result) of a current reception sensitivity test using the test signal, which has an output level after the variable setting, and a test result of a previous reception sensitivity test exceeds a range of a fluctuation range (EL) set by the test condition setting unit 18a, and outputs the test result in a case where the test result fluctuation range is in the fluctuation range (EL). The measurement result output unit 18f constitutes pass or fail determination means of the present invention, together with the reception sensitivity test control unit 18.

Figure 4:
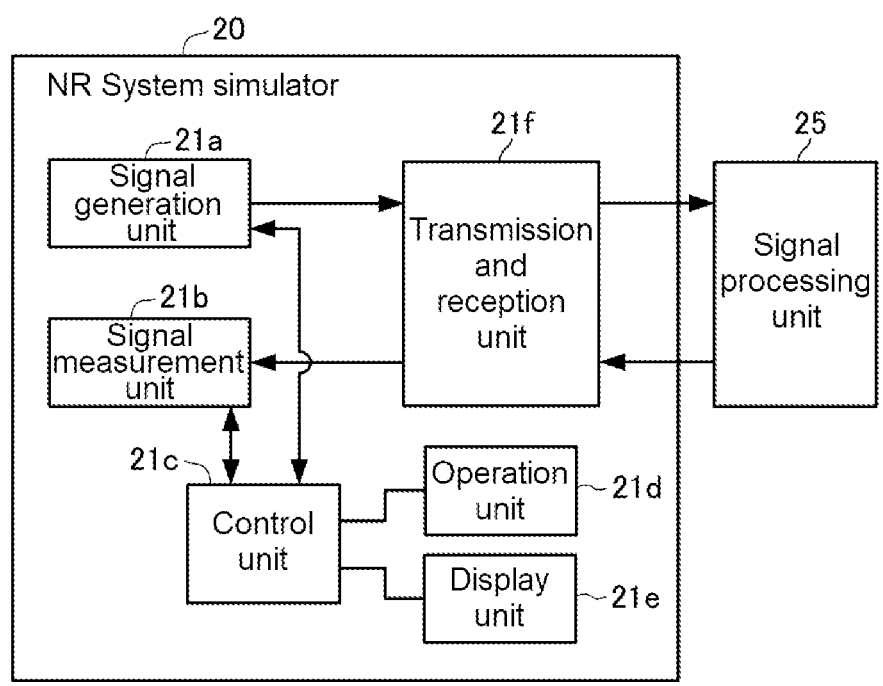
FIG. 4 is a block diagram showing a functional configuration of an NR system simulator in the measurement device according to the embodiment of the present invention.

As shown in FIG. 4, the NR system simulator 20 includes a signal generation unit 21a, a transmission and reception unit 21f, a signal measurement unit 21b, a control unit 21c, an operation unit 21d, and a display unit 21e. The NR system simulator 20 constitutes a signal generator of the present invention.

The signal generation unit 21a generates a signal (baseband signal) that becomes a source of the test signal. The transmission and reception unit 21f functions as an RF unit that generates the test signal corresponding to a frequency of each communication standard from the signal generated by the signal generation unit 21a and sends the generated test signal to the signal processing unit 25, and restores the baseband signal from the signal under measurement which is sent from the signal processing unit 25. The signal measurement unit 21b performs measurement process of the signal under measurement based on the baseband signal restored by the transmission and reception unit 21f.

The control unit 21c comprehensively controls each of the functional units including the signal generation unit 21a, the signal measurement unit 21b, the transmission and reception unit 21f, the operation unit 21d, and the display unit 21e. The operation unit 21d is a functional unit for inputting various information such as commands, and the display unit 21e is a functional unit for displaying various information such as an input screen of the various information and measurement results.

In the measurement device 1 having the configuration described above, the DUT 100 is mounted on the mounting tray 56d of the DUT scanning mechanism 56 (biaxial positioner) in the internal space 51 of the OTA chamber 50, and it is possible to measure measurement items such as Equivalent Isotropic Radiated Power (EIRP)-Cumulative Distribution Function (CDF), Equivalent Isotropic Sensitivity (EIS)-CDF, Total Radiated Power (TRP) which are related to the radio signal of the DUT 100 while rotating the DUT 100 together with the mounting tray 56d in biaxial (azimuth axis and roll axis) directions (while changing the angle of the positioner).

Here, control (total spherical scanning) of an angle of the DUT 100 by changing the angle of the biaxial positioner, which is required in a case of measuring each of the measurement items described above, will be described with reference to FIGS. 5A and 5B and FIG. 6.

Generally, related to measurement of radiated power targeting the DUT 100, a method for measuring equivalent isotropic radiated power (EIRP) and a method for measuring total radiated power (TRP) are known. The EIRP is, for example, a power value measured at each measurement point ($\theta$, $\varphi$) in a spherical coordinate system (r, $\theta$, $\varphi$) shown in FIG. 5A. On the other hand, the TRP is obtained by measuring the EIRP in all orientations of the spherical coordinate system (r, $\theta$, $\varphi$), that is, at a plurality of angular sample points PS (refer to FIG. 5B), which are regulated in advance, on a spherical surface equidistant from a center O1 (hereinafter, a reference point) of the total spherical scanning of the DUT 100, and obtaining a total sum thereof.

In the present embodiment, the number of divisions N$\theta$ and N$\varphi$ for calculating the total radiated power (TRP) is set to, for example, 12, respectively. As a result, in the present embodiment, the number of angular samples (N) is obtained as N=132 (=(12−1)×12). 132 angular sample points PS obtained as above are located as shown in FIG. 5B when represented on a surface of the sphere B.

In the measurement device 1 according to the present embodiment, as shown in FIG. 5B, the EIRP is measured at positions of 132 points equidistant from the reference point of the spherical coordinate system (r, $\theta$, $\varphi$), and, further, the EIRP is added at positions of all the point. Further, based on a result of addition of each EIRP, that is, a total sum of the EIRP at all the angular sample points PS of 132 points, the total radiated power (TRP) of the DUT 100 is obtained.

In a case where TRP measurement is performed, the integrated control device 10 drives and controls the DUT scanning mechanism 56 to perform the total spherical scanning of the DUT 100. In the total spherical scanning of the DUT 100, the integrated control device 10 rotationally drives the turntable 56a around the azimuth axis while repeatedly driving/non-driving the drive motor 56f, and rotationally drives the mounting tray 56d around the roll axis while repeatedly driving/non-driving the drive motor 56g. Here, the integrated control device 10 performs control so that the drive motor 56f and the drive motor 56g are non-driven at each timing in which the antenna surface of the antenna 110 faces one angular sample point PS. By controlling the total spherical scanning of the DUT 100, the DUT 100 mounted on the mounting tray 56d is rotationally driven around the reference point so that the antenna surface of the antenna 110 sequentially faces (orients) all the angular sample points PS of the sphere B while the antenna 110 is held at a position of the reference point which is the center of the sphere B that regulates the spherical coordinate system (r, $\theta$, $\varphi$).

Figure 6:
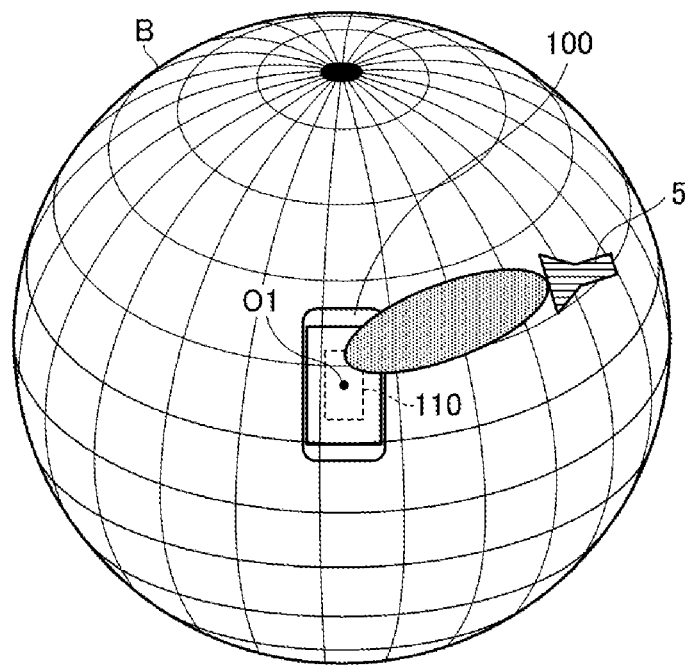
FIG. 6 is a diagram explaining a disposition mode of a test antenna 5 in the OTA chamber of the measurement device according to the embodiment of the present invention using the spherical coordinate system $(r, \theta, \varphi)$ shown in FIGS. 5A and 5B.

As shown in FIG. 6, the test antenna 5 is disposed at a position of a specific angular sample point PS (one point) in the spherical coordinate system (r, $\theta$, $\varphi$). In the above-described total spherical scanning, the DUT 100 is driven (scanned) so that the antenna surface of the antenna 110 sequentially faces the light reception surface of the test antenna 5. As a result, the test antenna 5 can transmit and receive a signal for the TRP measurement to and from the antenna 110 of the DUT 100 on which the total spherical scanning is performed. Here, the transmitted and received signal is a test signal that is transmitted from the NR system simulator 20 via the test antenna 5, and a signal that is transmitted by the DUT 100, which has received the test signal, using the antenna 110, that is, a signal under measurement that is received via the test antenna 5.

In the integrated control device 10, in accordance that the DUT 100 is scanned to pass through each angular sample point PS in a φ direction while maintaining a certain angle of θ in the spherical coordinate system (r, θ, φ) shown in FIG. 5B, the NR system simulator 20 is driven to generate the test signal by the signal generation unit 21a and the transmission and reception unit 21f, and the test signal is transmitted from the test antenna 5 via the signal processing unit 25. Here, in a case where the DUT 100 receives the test signal at the antenna 110, the DUT 100 sends out a response signal corresponding to the reception of the test signal.

The integrated control device 10 further drives the NR system simulator 20 so that a signal, which is transmitted by the DUT 100 in response to the reception of the test signal and is received by the test antenna 5, is received by the signal measurement unit 21b as the signal under measurement from the signal processing unit 25 via the transmission and reception unit 21f. Further, the integrated control device 10 drives and controls the signal measurement unit 21b to perform signal processing related to the measurement of the EIRP based on the received signal under measurement. In a case where the measurement control of the EIRP is performed in accordance with the total spherical scanning of the DUT 100 which passes through all the angular sample points PS by changing the angle of θ, it is possible to measure the EIRP for all the angular sample points PS of the spherical coordinate system (r, θ, φ) to correspond to NR in the NR system simulator 20. Further, the integrated control device 10 can obtain the TRP which is the total sum of the EIRP measurement values for all the angular sample points PS.

Further, the integrated control device 10 has an output level control function of adjusting the output level (power level) of the test signal in the NR system simulator 20 to an appropriate level regulated by, for example, the 3GPP standard before performing a performance test of the DUT 100, which is performed while changing an angle of the biaxial positioner (DUT scanning mechanism 56) in the OTA chamber 50, specifically, for example, measurement of measurement items such as EIRP-CDF, EIS-CDF, and TRP. With the output level control function, the output level of the test signal, at which the DUT 100 can exhibit maximum ability in a case of the measurement of each of the items, is searched (EIS search). Therefore, the above-described output level control function by the NR system simulator 20 can be regarded as a control function related to the reception sensitivity test for searching for the reception sensitivity for the DUT 100. The control function related to the reception sensitivity test is realized by the reception sensitivity test control unit 18 provided in the control unit 11 of the integrated control device 10.

(Convergence Control of Output Level of Test Signal in Reception Sensitivity Test)

In the integrated control device 10, the reception sensitivity test control unit 18 controls the reception sensitivity test of the DUT 100 by transmitting and receiving the test signal a plurality of times between the NR system simulator 20, which is the signal generator, and the DUT 100. In the control, a throughput is measured according to the transmission and reception of the test signal at each time during the reception sensitivity test to be converged to an output level, at which an appropriate value of the throughput (measurement result) is obtained, while performing level down or level up on the output level of the test signal according to the comparison result between the throughput measurement value and the throughput threshold value.

As an example of the convergence control of the output level of the test signal in the reception sensitivity test described above, in the measurement device 1 according to the present embodiment, the reception sensitivity test control unit 18 of the integrated control device 10 is provided with a first measurement parameter change setting function of performing change setting on specific setting parameters (for example, starting output level OL0 and initial step level SL0) of the test conditions set at the start of measurement of the DUT 100 from the initial setting value based on the AI prediction technology, to dynamically control the output level of the test signal so that the EIS search starting point is as close as possible to the end point of the original EIS search. By providing the first measurement parameter change setting function, in the measurement device 1 according to the present embodiment, the output level of the test signal is quickly converged to the target level so that the EIS search time can be significantly reduced, as compared to a method for sequentially changing (linearly changing) the output level by a constant level each time the number of measurements increases from the initially set output level (see curves L1 and L2 of FIG. 13), a method for controlling the output level to vary non-linearly while repeatedly decreasing or increasing the output level of the test signal (see curves NL1 and NL2 in FIG. 13), and further various existing methods for reducing the number of measurements by applying a CP determination process.

The AI prediction test condition change setting unit 18b provided in the reception sensitivity test control unit 18 as the first measurement parameter change setting function holds the AI prediction model Dai acquired by performing machine learning on the relationship between the parameter data and the measurement result data from the measurement log files of the reception sensitivity test of the DUT 100 in the past of the measurement device 1, and performs change setting on the above-described starting output level (OL0) and the initial step level (SL0) using the AI prediction model Dai to a value used for the first measurement or the second measurement based on the AI prediction.

Figure 7:
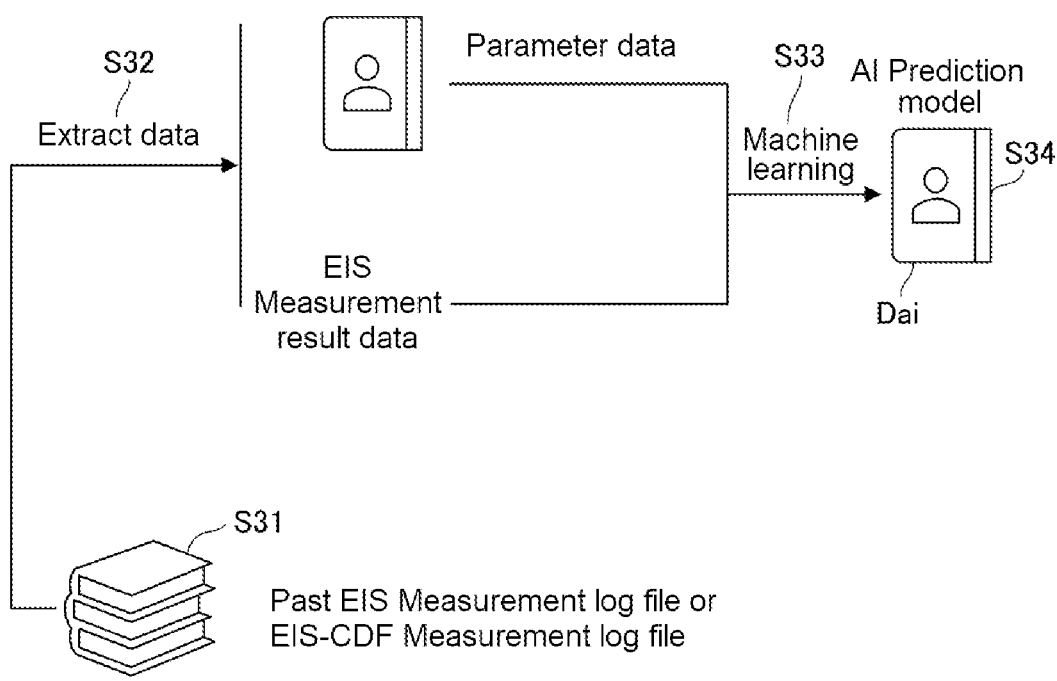
FIG. 7 is a conceptual diagram showing a generation processing procedure of an AI prediction model used in the measurement device according to the embodiment of the present invention.

The generation processing procedure of the AI prediction model Dai will be described in detail with reference to FIG. 7. As shown in FIG. 7, in order to generate the AI prediction model Dai, measurement log files are prepared which are collected from reception sensitivity measurements of the DUT 100 performed a plurality of times in the past in the measurement device 1 according to the present embodiment (step S31). The prepared measurement log files include, for example, an EIS measurement log file, an EIS-CDF measurement log file, or the like. The measurement log files preferably collect a number corresponding to the number of measurements (for example, 10 or more) that can maintain sufficient accuracy as the AI prediction model Dai to be generated.

Next, in the generation processing procedure, the EIS measurement result data (EIS-CDF log file) from the EIS measurement log file (or EIS-CDF log file) collected through n measurements prepared in step S31 and the parameter data used (set) for each measurement are extracted (step S32). The parameter data extracted here include, for example, at least the loss of an external connection cable (external path loss), the angle of the DUT scanning mechanism 56, that is, the azimuth angle (θ, φ) of the DUT 100, and the frequency to be measured.

Furthermore, in the generation processing procedure, the relationship between the parameter data and the measurement result data extracted in step S32 is machine-learned using AI (step S33), and the machine-learning result is collected as the AI prediction model Dai and is stored in the predetermined storage area (step S34). Here, multiple types of AI prediction models Dai are generated to which the types of parameter data extracted from the past measurement log files are reflected. In the present embodiment, the AI prediction model Dai is stored in, for example, the AI prediction model storage unit 18b1 provided in the RAM 11c in the control unit 11 of the integrated control device 10.

As can be understood from the generation processing procedure shown in FIG. 7, the AI prediction model Dai generated by the generation processing procedure consists of statistical data of the relationship between the parameter data and the measurement result data in reception sensitivity tests of the DUT 100 performed a plurality of times in the past. In short, the AI prediction model Dai is the statistical data that indicates what measurement result is obtained with what value of the parameter data.

As a result, in the measurement device 1 according to the present embodiment, it is possible to search the setting parameters initially set in the reception sensitivity test of the DUT 100 for the output level, the step level, or the like of the test signal at an EIS search point within the range of the predetermined number of searches from the final EIS search point on an EIS search path in the existing measurement method by the AI prediction based on the AI prediction model Dai. In other words, in the measurement device 1 according to the present embodiment, it is possible to skip the EIS search up to the final EIS search point using the initially set setting parameters, start the EIS search from the final EIS search point, and significantly reduce the number of EIS searches.

Further, in the present embodiment, the external path loss, the azimuth angle (θ, φ) of the DUT 100, and the frequency to be measured are used as the parameter data for generating the AI prediction model Dai. Therefore, it is possible to derive an accurate AI prediction results obtained by considering each parameter data using the AI prediction model, and it is possible to set the test signal to a testable level in an extremely short time and reliably without dropping the measurement accuracy.

Figure 8:
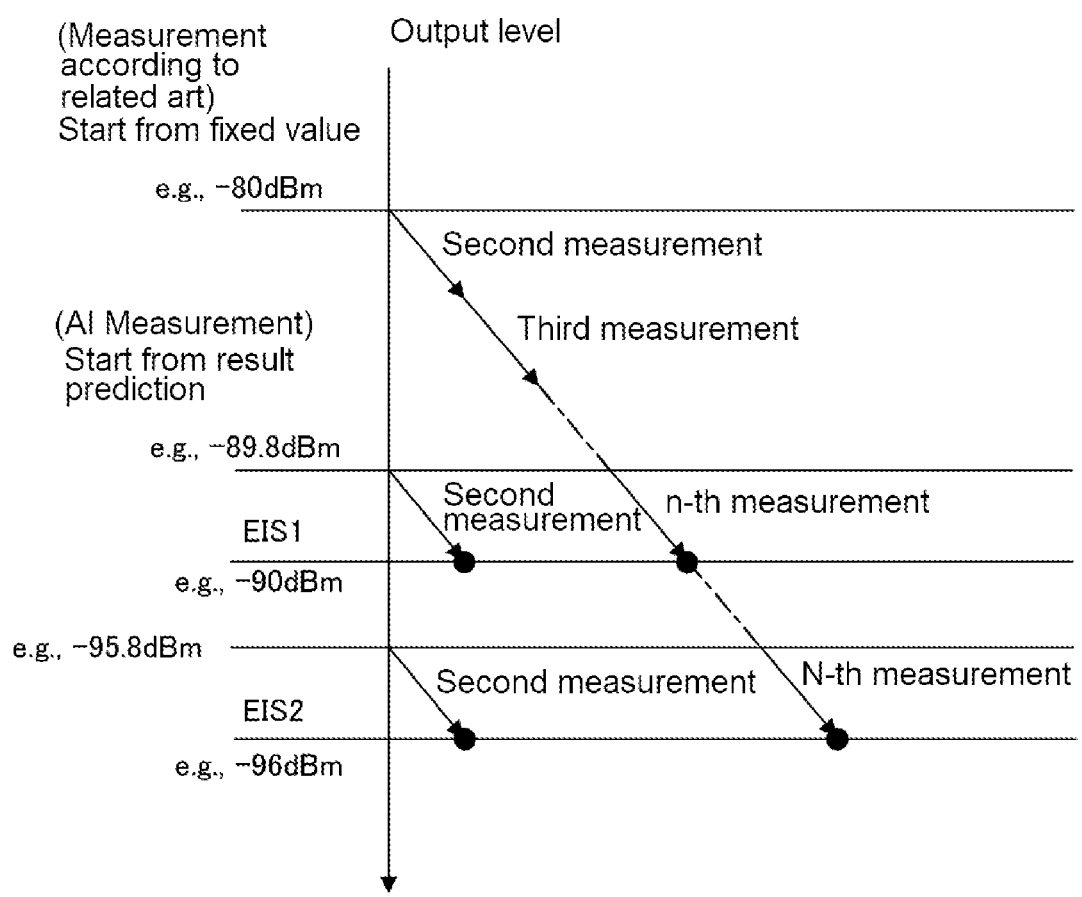
FIG. 8 is a schematic diagram for explaining the difference in measurement start positions between a DUT reception sensitivity test to which AI prediction is applied in the measurement device according to the embodiment of the present invention and a DUT reception sensitivity test in the existing device.

FIG. 8 shows a comparison example of measurement start positions of a DUT reception sensitivity test to which the AI prediction is applied in the measurement device 1 according to the present embodiment and a DUT reception sensitivity test in an existing device (device according to the related art). As shown in FIG. 8, in the existing device, regardless of whether the output level of the test signal is controlled linearly or non-linearly, the measurement starts from a fixed value (for example, OL0=−80 dBm) initially set at the start of measurement of the EIS ("measurement according to the related art" in FIG. 8). Therefore, in a case where the measurement of "EIS1", which satisfies an end condition at −90 dBm, is performed by a procedure of the "measurement according to the related art", the number of measurements is, for example, n. On the other hand, in a case where the "EIS2" measurement, which satisfies the end condition at −96 dBm, is performed by the procedure of the "measurement according to the related art", the number of measurements is, for example, N (N>n) which is even greater.

On the other hand, in the measurement using the AI prediction in the measurement device 1 according to the present embodiment ("AI measurement" in FIG. 8), the EIS search starts from an AI-predicted value (for example, OL01: (prediction value)) using the AI prediction model Dai from the initially set setting parameters. Here, in a case where EIS1 is measured, the AI-predicted value OL01 is a value corresponding to, for example, the EIS search point within a predetermined range (in this example, once time before) from the final EIS search point (point corresponding to "n-th measurement) in the "measurement according to the related art". As a result, in the measurement of EIS1 based on AI prediction, the first measurement is performed in such a way that the output level of the test signal is set to, for example, −89.8 dBm, the second measurement is sequentially performed in such a way that the output level is set to, for example, −90 dBm, and, in a case where it is determined that the end condition is satisfied here, the EIS search ends at the second measurement.

Further, in a case where EIS2 is measured, the AI predicted value OL01 is, for example, a value corresponding to the EIS search point within a predetermined range (in this example, one time before) from the final EIS search point (point corresponding to "N-th measurement) in the "measurement according to the related art". As a result, in the measurement of EIS2 based on AI prediction, the first measurement is performed in such a way that the output level of the test signal is set to, for example, −95.8 dBm, the second measurement is sequentially performed in such a way that the output level is set to, for example, −96 dBm, and, in a case where it is determined that the end condition is satisfied here, the EIS search ends at the second measurement.

As shown in FIG. 8, in the measurement device 1 according to the present embodiment, the output level of the test signal that starts the measurement according to the set parameters is dynamically and adaptively controlled, so that it is possible to significantly shorten the EIS search path, as compared to the "measurement according to the related art" in which measurement always starts from the fixed value, and it is possible to set the output level of the test signal to a testable level in a shorter time by significantly reducing the number of EIS searches.

Based on a time shortening method of the reception sensitivity test of the DUT 100 based on the AI prediction using the AI prediction model described above, a variable setting control operation of the output level of the test signal for the reception sensitivity test of the DUT 100 by the integrated control device 10 of the measurement device 1 according to the present embodiment will be described below with reference to FIGS. 9 and 10.

FIG. 9 is a flowchart showing the variable setting control operation of the output level of the test signal to which the AI prediction is applied in the reception sensitivity test of the DUT 100 in the measurement device 1 according to the present embodiment. In FIG. 9, steps S20, S1a, S25, S26, and S27 are a part of the output level change setting process to which the above-described AI prediction is applied. As a storage form of the control data for realizing the output level change setting process to which the AI prediction is applied, a method for storing data of the result which is AI-predicted in advance (prediction result data) based on the AI prediction model Dai from setting parameters and a method for storing the AI prediction model Dai and executing the AI prediction each time based on the AI prediction model Dai from the setting parameters initially set at the start of the reception sensitivity test of the DUT 100 are conceivable. The following description assumes that the former method is applied. All the storage destination of the control data is, for example, the AI prediction model storage unit 18b1.

In the measurement device 1 according to the present embodiment, in order to start the reception sensitivity test of the DUT 100 along the flowchart shown in FIG. 9, first, the reception sensitivity test control unit 18 in the control unit 11 of the integrated control device 10 performs setting (initial setting) of the test conditions (setting parameter) (step S1). Specifically, the test condition setting unit 18a receives an operation input in the operation unit 12, and sets, for example, respective values of the initial step level SL0, the starting output level OL0, the error tolerance level EL, the connection drop determination threshold value DT, and the determination condition of the steep drop region of the throughput (refer to steps S7 and S9a), which are described above.

As the starting output level OL0 and the initial step level SL0, which are set in step S1, for example, −75 dBm and 10 dB are assumed, respectively. The error tolerance level EL is assumed to be, for example, 0.2 dB. The connection drop determination threshold value DT is assumed to be, for example, −90 dBm. Further, as the determination condition of the steep drop region of the throughput, for example, a condition is assumed that the throughput measurement value is set to a range of a proportion which exceeds 95% and is equal to or less than 99% with respect to the reference value.

After completing the initial setting of the test conditions in step S1, the reception sensitivity test control unit 18 performs a process of changing and setting the initially set starting output level OL0 based on the AI prediction (step S1a). Specifically, in the reception sensitivity test control unit 18, the AI prediction test condition change setting unit 18b searches for the AI prediction result data based on the AI prediction model Dai stored in the AI prediction model storage unit 18b1 based on, for example, the starting output level OL0 set in step S1 (step S20), and performs change setting on the value of the starting output level OL0 which is being set to the AI prediction output level (OL01) which is AI-predicted in advance corresponding to the starting output level OL0 (step S1a). That is, the change setting is performed on the initially set starting output level OL0 to the first output level OL01.

Next, the reception sensitivity test control unit 18 increments the number of measurements n by +1 (step S2), and performs a process of setting a parameter related to the N-th measurement, and reading a value of the output level OL set in step S8 (including steps S8a and S8b) of performing, for example, the OL level down process or step S9 of performing the OL level up process before the setting (step S3). Subsequently, the reception sensitivity test control unit 18 performs control to perform the n-th measurement related to the throughput of the DUT 100 while transmitting the test signal based on the parameter, which is set (or read) in step S3, related to the measurement (step S4).

As a specific example of the control in steps S3 and S4 (throughput measurement control), the reception sensitivity test control unit 18 reads, as the parameter related to a first measurement, a first output level OL01 set through the change setting based on the setting of the test conditions in step S1 and the AI prediction in step S20, and performs the throughput measurement while driving and controlling the DUT 100 at the first output level OL01.

Next, the reception sensitivity test control unit 18 checks whether or not a step level interval with respect to the previous throughput measurement related to the current throughput measurement, that is, the step level SL(n) is larger than the error tolerance level EL which is set in step S1 (step S5). When it is determined that the step level SL(n) is larger than the error tolerance level EL (YES in step S5), the reception sensitivity test control unit 18 proceeds to step S25 and continues the throughput measurement and step level search control. As described above, a first throughput measurement starts from the transmission of the test signal at the first output level OL01, and there is no width of change of SL with respect to the previous measurement, so that the process of step S5 is skipped and the process proceeds to step S25.

In step S25, the reception sensitivity test control unit 18 checks whether or not the number of measurements N is 1. Here, in a case where it is determined that the number of measurements N is not 1 (that is, 2 or more) (NO in step S25), the reception sensitivity test control unit 18 proceeds to a process after step S6, that is, a measurement process based on the existing measurement method.

On the other hand, in a case where it is determined that the number of measurements N is 1 (YES in step S25), the reception sensitivity test control unit 18 performs a process of acquiring the AI prediction step level SL01 which is AI-predicted in advance from the initial step level SL0 set in step S1, and a process of setting an output level OL1 used for the second measurement based on the acquired AI prediction step level SL01 (step S26 and step S27). Specifically, in the reception sensitivity test control unit 18, the AI prediction test condition change setting unit 18b searches for the AI prediction result data stored in the AI prediction model storage unit 18b1, and acquires the AI prediction step level SL01 which is AI-predicted in advance from the initial step level SL0 set in step S1 (step S26). Next, the AI prediction test condition change setting unit 18b performs a process of setting the output level OL1 (=OL01+SL01) of the test signal used for the second measurement based on the acquired AI prediction step level SL01 and the first output level OL01 changed and set in step S1a (step S27).

Thereafter, the reception sensitivity test control unit 18 continues the processes in steps S2, S3, and S4. That is, the reception sensitivity test control unit 18 increments the number of measurements n by +1 (step S2), sets the parameters for the second measurement, reads the value of the output level OL1 set before, for example, in step S27 based on the AI prediction (step S3), and, thereafter, controls to perform the second measurement related to the throughput of the DUT 100 while transmitting the test signal based on the set (or read) parameters related to the measurement (step S4).

Specifically, in the control (throughput measurement control) in steps S3 and S4, the reception sensitivity test control unit 18 reads the output level OL1 (=OL01+SL01) set in step S27, and performs second throughput measurement while driving and controlling the DUT 100 at the output level OL1.

Further, the reception sensitivity test control unit 18 checks whether or not a step level interval with respect to the previous throughput measurement related to the current throughput measurement, that is, the step level SL(n) is larger than the error tolerance level EL which is set in step S1 (step S5).

Here, in a case where it is determined that the step level SL(n) is equal to or less than the error tolerance level EL (NO in step S5), the reception sensitivity test control unit 18 stops the throughput measurement and the step level search, and ends a series of measurement operations by outputting the measurement result at this time (step S10). In accordance with this, the reception sensitivity test control unit 18 performs a process of feeding back the throughput measurement result output in step S10 and the parameter data set by the AI prediction test condition change setting unit 18b and updating the AI prediction model Dai (AI prediction model A1) used in step S20 (step S11).

On the other hand, in a case where it is determined that the step level SL(n) is greater than the error tolerance level EL (YES in step S5), the reception sensitivity test control unit 18 checks whether or not the number of measurements N is 1 (step S25). Here, in a case where it is determined that the number of measurements N is not 1 (that is, 2 or more) (NO in step S25), the reception sensitivity test control unit 18 executes the process after step S6, that is, the measurement process based on the existing measurement method.

As described above, in the variable setting control operation of the output level of the test signal related to the reception sensitivity test of the DUT 100 in the measurement device 1 according to the present embodiment shown in FIG. 9, an example is provided in which the setting change based on AI prediction from the starting output level OL0 initially set in step S1 is limited to two times (step S1a and step S26), and, in a case where the determination result of "YES" is not obtained in step S5 during that time, the measurement process based on the existing measurement method after step S6 is executed. Here, the number of change settings based on the AI prediction is not limited to two times, and other numbers of times are also possible.

The measurement process based on the existing measurement method after step S6 is the same as a process after step 6 in the flowchart of FIG. 7 of Patent Document 1, and the outline us as below.

First, in step S6, the reception sensitivity test control unit 18 compares the throughput measurement value in step S4 with a preset throughput threshold value, and, in a case where it is determined that the throughput measurement value is equal to or greater than the throughput threshold value (state of "PASS" in step S6), proceeds to step S7 and determines whether or not the determination condition is satisfied that the throughput measurement value is set to the range of the proportion which exceeds 95% and is equal to or less than 99% with respect to the reference value.

Figure 10A:
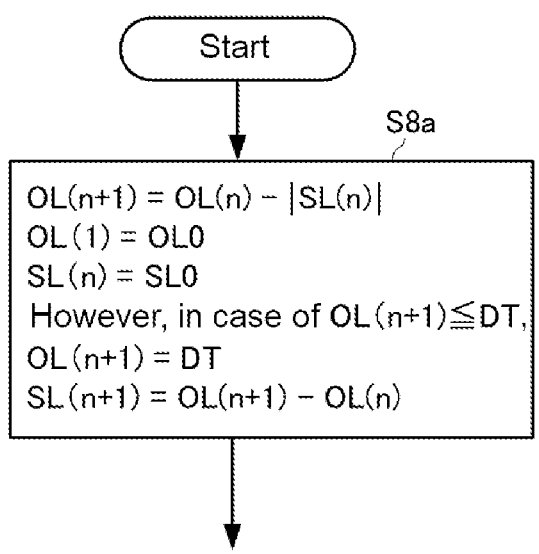
Figure 10B:
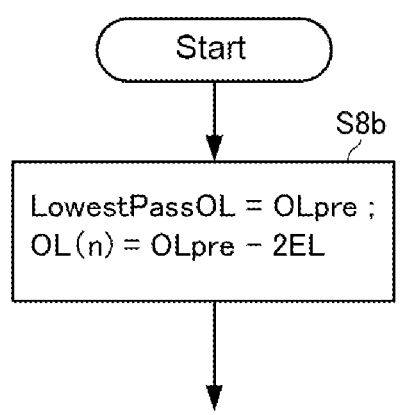

In a case where it is determined that the throughput measurement value exceeds 99% with respect to the reference value and the determination condition is not satisfied (NO in step S7), the reception sensitivity test control unit 18 executes an OL level (output level) down process (A) of lowering the output level of the test signal (step S8a). On the other hand, in a case where the drop state determination unit 18d determines that the throughput measurement value is within the range of proportion which exceeds 95% and is equal to or less than 99% with respect to the reference value and the determination condition is satisfied (YES in step S7), the reception sensitivity test control unit 18 executes the OL level down process (B) (step S8b). The OL level down process (A) is shown in FIG. 10A, and the OL level down process (B) is shown in FIG. 10B.

On the other hand, in a case where it is determined that the throughput (measurement value) is equal to or less than the throughput threshold value (in a state of "FAIL" in step S6) in step S6, the reception sensitivity test control unit 18 sequentially executes a determination process in step S9a. Here, in a case where the throughput measurement value exceeds 80% with respect to the reference value and it is determined that the determination condition is satisfied (YES in step S9a), the OL level up process (A) of raising the output level of the test signal is executed. On the other hand, in a case where it is determined that the throughput measurement value is equal to or less than 80% with respect to the reference value and the determination condition is not satisfied (NO in step S9a), the OL level up process (B) or (C) is executed according to the determination result in step S9c.

After processing of the OL level down processes (A) and (B) or the OL level up processes (A), (B), and (C), the reception sensitivity test control unit 18 continues the processes in steps S2 to S4. In a case where it is determined in subsequent step S5 that the step level SL(n) is equal to or lower than the error tolerance level EL (NO in step S5), the reception sensitivity test control unit 18 stops the throughput measurement and the step level search (step S10), and thereafter, ends the series of measurement operation. Here, the reception sensitivity test control unit 18 performs a process of feeding back the throughput measurement result and updating the AI prediction model Dai (AI prediction model A1) used in step S20 (step S11).

According to the series of measurement control shown in FIG. 9, the change setting process (see steps S20, S1a, S25, S26, and S27) performed on the starting output level OL0 and the initial step level SL0 initially set in step S1 based on the AI prediction is targeted to be performed, for example, up to the second measurement.

According to the change setting process for the starting output level OL0 based on the AI prediction, for example, it is possible to complete the measurement with only two EIS path searches, and it is possible to further reduce the number of EIS searches as compared to the measurement based on the existing measurement methods that employ the non-linear and the CP determination condition executed after step S6 in FIG. 9. This point will be described below with specific examples.

Figure 12:
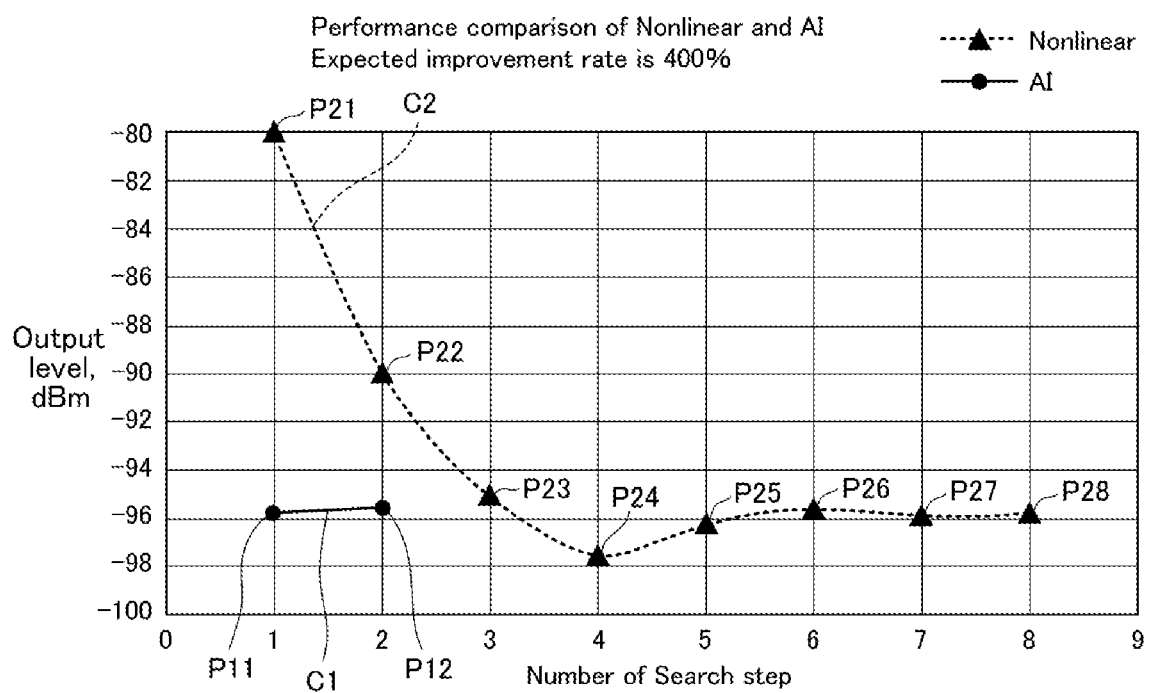
FIG. 12 is a graph showing the relationship between the number of measurements related to the reception sensitivity test of the DUT to which the AI prediction is applied in the measurement device according to the embodiment of the present invention and the reception sensitivity test of the DUT in the existing device, and the output level of the test signal and the pass or fail determination result of the throughput measurement result, the relationship being shown in the table of FIG. 11.

FIG. 11 is a table showing the relationship between the number of measurements related to the reception sensitivity test of the DUT 100 to which the AI prediction is applied in the measurement device 1 according to the present embodiment and the reception sensitivity test of the DUT 100 in the existing device, and the output level of a test signal and the pass or fail determination result of the throughput measurement result. FIG. 12 is a graph showing the relationship between the number of measurements related to the reception sensitivity test of the DUT 100 to which the AI prediction is applied in the measurement device 1, which is shown in the table of FIG. 11, according to the present embodiment and the reception sensitivity test of the DUT 100 in the existing device, and the output level of the test signal and the pass or fail determination result of the throughput measurement result.

In the table shown in FIG. 11, the second and third columns from the left show a data example related to the reception sensitivity test of the DUT 100 by non-linear output level control in the existing device, the fourth and fifth columns from the left show the relationship between the number of measurements related to the reception sensitivity test of the DUT 100 to which the output level control by the AI prediction of the measurement device 1 according to the present embodiment is applied, and the pass or fail determination result of the output level and the throughput measurement result of the test signal. Similarly, in the graph shown in FIG. 12, a graph corresponding to the data example of the output level control of the test signal according to the AI prediction related to the present embodiment in FIG. 11 is shown using reference numeral C1 (a graph showing a relationship between the number of measurements and the output level), and a graph corresponding to the data example of the output level control of the non-linear test signal in the existing device in FIG. 11 is shown using reference numeral C2 (a graph showing a relationship between the number of measurements and the output level).

As shown in FIG. 11 (see first to third columns from the left) and characteristic C2 in FIG. 12, in the reception sensitivity test of the DUT 100 by the non-linear output level control in the existing device, a first test starts while the DUT 100 is set to the output level OL(0)=−80 dBm at a measurement point P21 of the characteristic C2, and the OL level down process is performed after the throughput measured at this time is determined to be within the allowable range (PASS).

As a result of the OL level down process, the second test starts while the DUT 100 is set to the output level OL(1)=−90 dBm at a measurement point P22 of the characteristic C2, and the OL level down process is performed after the throughput measured at this time is determined to be within the allowable range (PASS).

As a result of the OL level down process, the third test starts while the DUT 100 is set to the output level OL(2)=−95 dBm at a measurement point P23 of the characteristic C2, and the OL level down process is performed after the throughput measured at this time is determined to be within the allowable range (PASS).

As a result of the OL level down process, the fourth test starts while the DUT 100 is set to the output level OL(3)=−97.5 dBm at a measurement point P24 of the characteristic C2, and the OL level up process is performed after the throughput measured at this time is determined to be out of the allowable range (FAIL).

As a result of the OL level up process, the fifth test starts while the DUT 100 is set to the output level OL(4)=−96.2 dBm at a measurement point P25 of the characteristic C2, and the OL level up process is performed after the throughput measured at this time is determined to be out of the allowable range (FAIL).

As a result of the OL level up process, the sixth test starts while the DUT 100 is set to the output level OL(5)=−95.6 dBm at a measurement point P26 of the characteristic C2, and the OL level down process is performed after the throughput measured at this time is determined to be within the allowable range (PASS).

As a result of the OL level down process, the seventh test starts while the DUT 100 is set to the output level OL(6)=−95.9 dBm at a measurement point P27 of the characteristic C2, and the OL level up process is performed after the throughput measured at this time is determined to be out of the allowable range (FAIL).

As a result of the OL level up process, the eighth test starts while the DUT 100 is set to the output level OL(7)=−95.8 dBm at a measurement point P28 of the characteristic C2, and the throughput measured at this time is determined to be out of the allowable range (FAIL). However, the step level SLn between the throughput and the previous (seventh) measured throughput becomes equal to or lower than the error tolerance level EL, and the series of measurements ends.

On the other hand, as shown in FIG. 11 (see the first, fourth, and fifth columns from the left) and the characteristic C1 in FIG. 12, according to the reception sensitivity test of the DUT 100 to which the output level control by the AI prediction is applied in the measurement device 1 related to the present embodiment, a first test starts while the DUT 100 is set to the first output level OL(01)=−95.9 dBm which is changed and set by the AI prediction (see steps S20 and S1a of FIG. 9) at a measurement point P11 of the characteristic C1, and the OL level up process is performed after the throughput measured at this time is determined to be out of the allowable range (FAIL).

As a result of the OL level up process, the second test starts while the DUT 100 is set to the output level OL(1)=−95.8 dBm, which is set and changed by the AI prediction (see steps S26 and S27 in FIG. 9) at a measurement point P12 of the characteristic C1, and the throughput measured at this time is determined to be within the allowable range (PASS). However, the step level SLn between the throughput and the previous (first) measured throughput is equal to or lower than the error tolerance level EL, and the measurement ends.

Even though non-linear output level control is performed in the reception sensitivity test of the DUT 100 in the existing device, as shown by the characteristic C2 in FIG. 12, it is necessary to perform eight measurements at P21, P22, P23, P24, P25, P26, P27, and P28.

On the other hand, in the reception sensitivity test of the DUT 100 in the measurement device 1 according to the present embodiment, dynamic control of the first output level of the test signal is applied based on AI prediction, so that it is possible to end the reception sensitivity test with the two measurements at P11 and P12.

A reason that it is possible to end the reception sensitivity test of the DUT 100 in the measurement device 1 according to the present embodiment with a small number of measurements is that the AI prediction technology is used based on the AI prediction model Dai generated from the past measurement log files and the first measurement starts from a value close to the setting parameter (for example, output level) just before the end of the past measurement. In order to realize this, in the measurement device 1 according to the present embodiment, by the AI prediction, the change setting is performed on the initially set starting output level OL0 (for example, −75 dBm) to an AI prediction output level OL01 (for example, −95.9 dBm: see FIG. 11) corresponding to the value obtained, for example, two times before from the end of measurement in the past measurement. Here, the closer the value of the changed and set setting parameter (AI prediction output level (first output level) OL01) to the value near the end of measurement of the same setting parameter in the past measurement, it is possible to shorten the convergence time to the output level at which the target throughput value (measurement result) is obtained.

The time shortening effect of the reception sensitivity test of the DUT 100 to which the AI prediction is applied in the measurement device 1 according to present embodiment will be described with reference to FIG. 13. In a graph shown in FIG. 13, curves L1 and L2 show search paths of the EIS search based on the linear output level control in the reception sensitivity test of the DUT 100 in the existing device, and curves NL1 and NL2 show search paths of the EIS search based on the non-linear output level control in the DUT reception sensitivity test in the existing device. As shown by the curve L2 and the curve NL2, both the EIS searches based on the linear and non-linear output level control in the reception sensitivity test of the DUT 100 in the existing device end at an EIS point 1.

Under such measurement conditions, in a case where the measurement is performed using the AI prediction in the measurement device 1 according to the present embodiment, for example, from the first measurement OL level (starting output level) set at the start of the measurement based on the non-linear output level control, by the AI prediction in which the AI prediction model Dai is used, it is possible to set, for example, a value (AI prediction result) corresponding to an AI prediction point Pai0 within an AI prediction range Rai in the predetermined range from the EIS point 1 as the above-described first output level OL01 (see step S1a in FIG. 9). As a result, as shown by curve Lai on the graph of FIG. 13, the EIS search path in a case where the AI prediction is applied in the measurement device 1 includes two measurements which start from the AI prediction point Pai0 within the AI prediction range Rai and end at the EIS point 1 through a subsequent AI prediction point Pai1 (measurement result).

Figure 13:
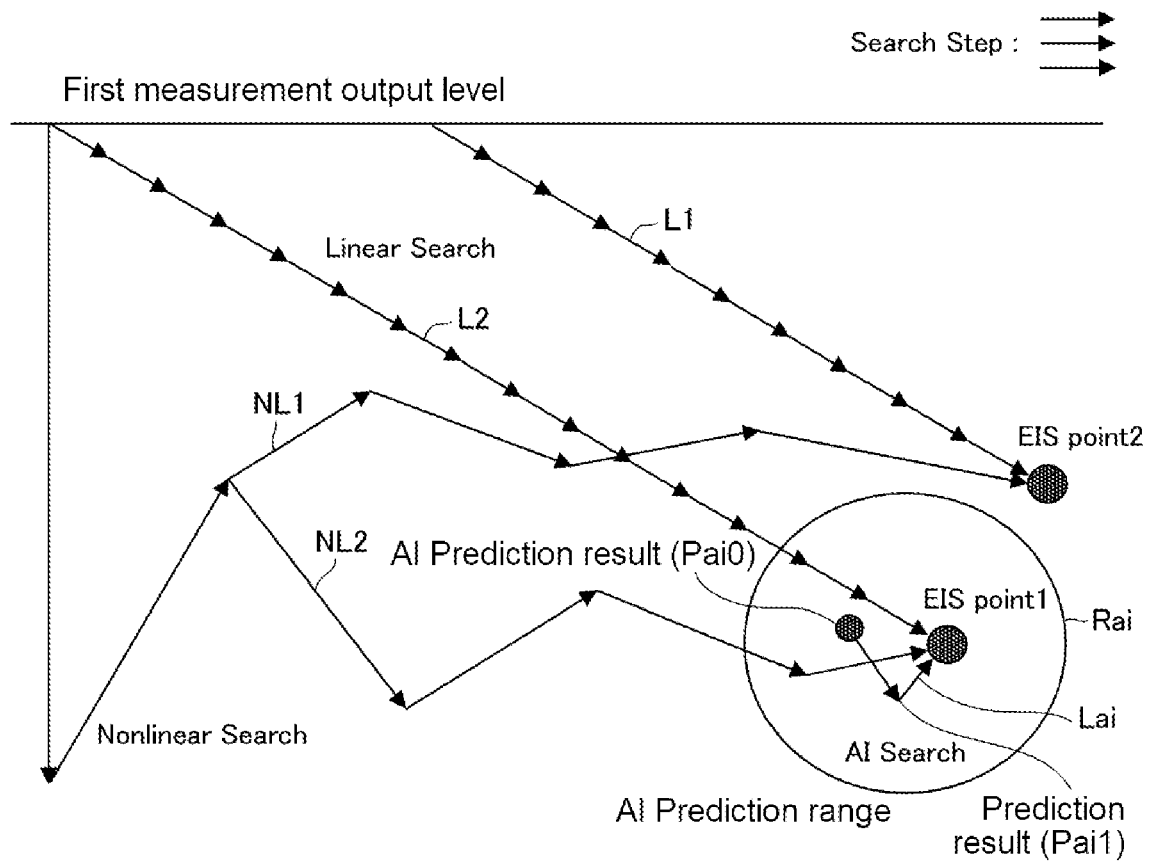
FIG. 13 is a graph for explaining the difference in EIS search paths between the DUT reception sensitivity test to which the AI prediction is applied in the measurement device according to the embodiment of the present invention and the DUT reception sensitivity test in the existing device.

In a case where description is performed while assuming the reception sensitivity test of the DUT 100 when the measurement result data shown in FIGS. 11 and 12 is obtained, in step S1a of FIG. 9, the measurement device 1 according to the present embodiment changes and sets the value (first output level OL01) corresponding to the AI prediction point Pai0 within the AI prediction range Rai shown in FIG. 13 from the starting output level OL0 set in step S1 based on the AI prediction. Thereafter, in a case where the second measurement is performed, the value OL1=(OL01+SL01) corresponding to the AI prediction point Pai2 within the AI prediction range Rai shown in FIG. 13 is changed and set based on the AI prediction in step S27 of FIG. 9. After the second throughput measurement, the determination of "YES" is obtained in step S5, and the measurement ends.

FIG. 13 discloses the AI prediction result of the output level in a case where the EIS measurement is performed for each angular sample point PS shown in FIG. 5B. However, more time is required in a case where the EIS-CDF measurement is performed. Here, with reference to FIG. 14, the relationship is verified between the measurement time achievable in the EIS-CDF measurement to which the AI prediction is applied in the measurement device 1 according to the present embodiment and the number of measurements for machine learning. For the measurement conditions in the measurement device 1 for the verification, for example, Meas. Metric (measurement target) is set to EIS-CDF, Grid Type is set to Constant Step, Pont (the number of angular sample points PS) is set to 168, Range (measurement range) is set to a hemisphere, Step (angle to move to the next angular sample point PS) is set to 15 deg, Error Control (the same as the above-described "error tolerance level EL") is set to 0.2 dB.

Figure 14:
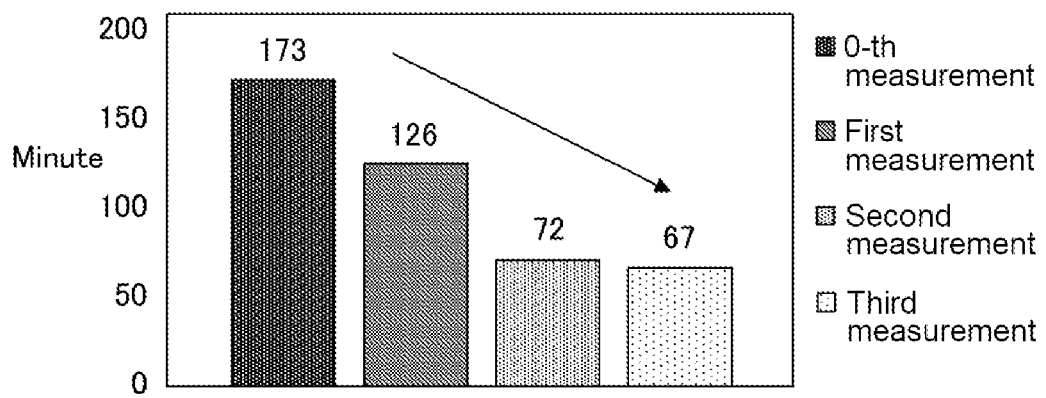
FIG. 14 is a graph showing the relationship between the measurement time of an EIS-CDF measurement to which the AI prediction is applied and the number of measurements for machine learning in the measurement device according to the embodiment of the present invention.
Figure 15:
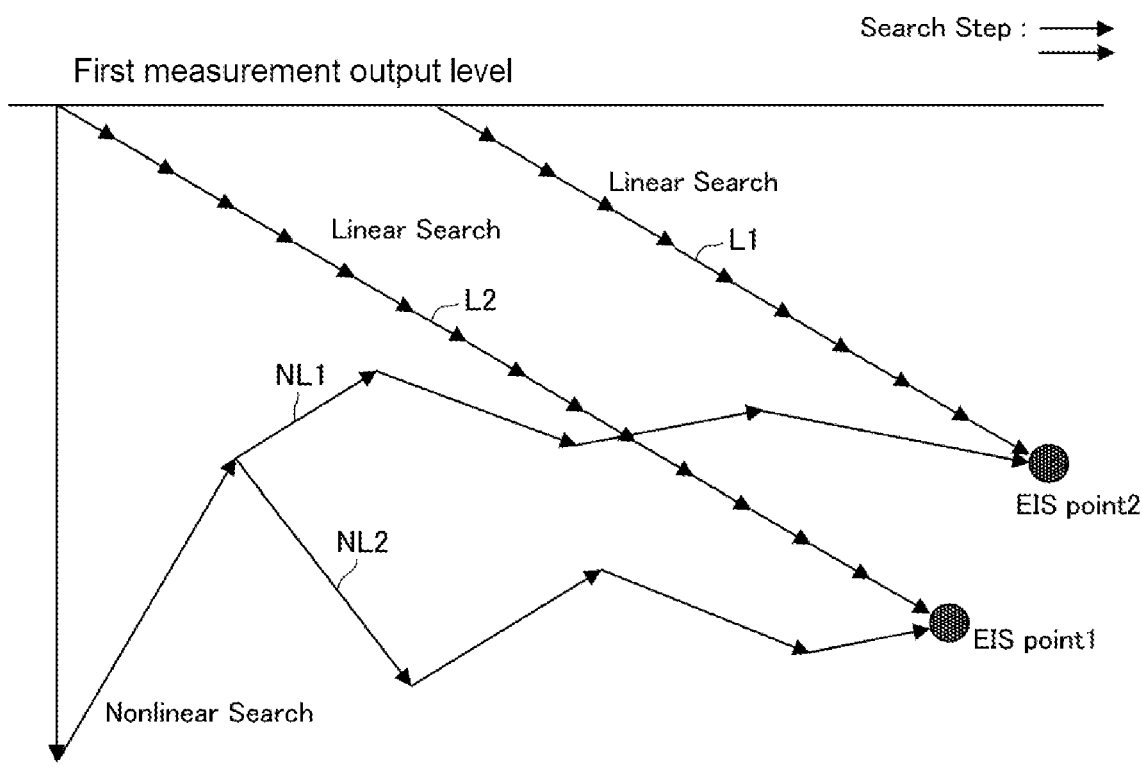
FIG. 15 is a graph showing side by side various EIS search paths based on the linear and non-linear control of the test signal related to the DUT reception sensitivity test in the existing device.

In a case where the EIS-CDF measurement is performed in the measurement device 1 prepared for the verification under the above-described measurement conditions, the verification results shown in a graph of FIG. 14 are obtained according to the number of measurements. In the graph of FIG. 14, the measurement corresponding to "0-th measurement" corresponds to a measurement result obtained without applying the AI prediction, that is, in a case where the measurement is performed in a device according to the related art. Also, the measurement corresponding to the "first measurement" corresponds to a measurement result obtained by using the AI prediction model prepared by default. In addition, the measurements corresponding to the "second measurement" and later (in this example, the measurement corresponding to the "second measurement" and the measurement corresponding to the "third measurement") correspond to measurement results using the AI prediction model obtained by the machine learning based on the immediately before measurements, that is, the measurement corresponding to the "first measurement" and the measurement corresponding to the "second measurement". As shown in the graph of FIG. 14, it takes 173 minutes to end the measurement in the measurement corresponding to the "0-th measurement". On the other hand, in the measurement corresponding to the "first measurement", machine learning is applied, and as a result of starting the measurement from the AI-predicted output level OL01, the measurement ends in 126 minutes which is shorter than the measurement corresponding to the "0-th measurement". Furthermore, the measurement corresponding to the "second measurement" and the measurement corresponding to the "third measurement" show a tendency that the time to end the measurement is 72 minutes and 67 minutes, respectively, and the measurement time is shortened as the number of times of machine learning increases. From the graph shown in FIG. 14, it can be understood that the machine learning effect related to shortening of the measurement time begins to appear from the second to third machine learning times. From this, it can be inferred that further improvement in measurement speed can be expected by using the measurement device 1 to store measurement information in the future.

It is possible to execute a work of storing the measurement information using the measurement device 1, for example, according to the procedure shown in FIG. 7, as described above. Here, for the measurement conditions and the number of measurements that can be expected to improve the measurement speed, the inventors of the present invention can confirm that, in a case where the measurement conditions are set to be "automatic update just by performing EIS/EIS-CDF measurement", the effect of improving the measurement speed began to appear from about 10 machine learning times.

In the above embodiment, the reception sensitivity test operation control specialized for the measurement on a single surface (EIS measurement) is illustrated. However, the present embodiment can be applied to a reception sensitivity test related to the measurement on the entire spherical surface (TRP measurement: refer to FIGS. 5A and 5B).

Further, the above embodiment discloses a system configuration example in which the integrated control device 10 is provided outside the measurement device 1. However, the present invention may have a configuration in which the measurement device 1 is provided with a control function of the integrated control device 10.

As described above, according to the present embodiment, there is provided a measurement device 1, which includes a signal generator 20 that generates a test signal and a reception sensitivity test execution unit 18 that performs a reception sensitivity test of a mobile terminal (DUT 100) by transmitting and receiving the test signal a plurality of times between the signal generator and the DUT, and tests the mobile terminal that is a device under test, the measurement device 1 includes a test condition setting unit 18a that initially sets a test condition including a step level SL0 and an output level OL0 of the test signal at start of the reception sensitivity test, a measurement result output unit 18f that performs a throughput measurement by transmitting and receiving the test signal under the test condition and comparing a throughput measurement result with a determination threshold value to perform pass or fail determination, an output level variable setting unit 18e that sets the output level according to a result of the pass or fail determination of a previous throughput measurement in a case where the result of the pass or fail determination is fail, and an AI prediction test condition change setting unit 18b that holds an AI prediction model generated by performing machine learning on a relationship between parameter data and measurement result data from a measurement log file of the past reception sensitivity test using artificial intelligence, and sets an AI prediction output level OL01, which is AI-predicted in advance by the AI prediction model based on the test condition set by the test condition setting unit, as a first output level instead of the output level OL0.

With this configuration, in the measurement device 1 according to the present embodiment, it is possible to quickly set the first output level of the test signal to a value close to the end of the measurement with existing non-linear control or the like by AI prediction, and, it is possible to set the output level of the test signal to a testable level in an extremely short time by significantly reducing the number of measurements compared to methods according to the related art, such as non-linear control and CP control, and thus it is possible to efficiently perform the reception sensitivity test of the mobile terminal.

In addition, in the measurement device 1 according to the present embodiment, the AI prediction test condition change setting unit 18b may set, instead of the step level SL0, an AI prediction step level SL01, which is AI-predicted in advance by the AI prediction model based on a measurement result of a first throughput measurement performed by transmitting and receiving the test signal at the AI prediction output level, as a step level for second and subsequent measurements.

With this configuration, the measurement device 1 according to the present embodiment dynamically controls not only the initial step level of the test signal but also the first step level by the AI prediction. Therefore, compared to a case of continuing the measurement by the method according to the related art, such as the non-linear control and the CP control, it is possible to set the test signal to a testable level in a shorter time and it is possible to further improve the efficiency of the reception sensitivity test of the mobile terminal.

Further, in the measurement device 1 according to the present embodiment, the AI prediction test condition change setting unit 18b, in a case where a result of the pass or fail determination for the measurement result of the first throughput measurement is fail, thereafter, may perform an update process of the output level for a next measurement using the AI prediction step level SL01 until a second throughput measurement.

With this configuration, in the measurement device 1 according to the present embodiment, it is possible to avoid a situation in which the dynamic control described above is repeated uselessly even though the dynamic control of the first output level of the test signal by the AI prediction and the step level is limited to the second throughput measurement and the measurement starts from a value close to the end of the measurement in the non-linear control or the like.

Further, in the measurement device 1 according to the present embodiment, the AI prediction test condition change setting unit 18b may designate loss of an external connection cable, an azimuth angle (θ, φ) of the DUT 100, and a frequency to be measured as the parameter data, and may hold the AI prediction model generated by performing the machine learning on the relationship between the parameter data and the measurement result data.

With this configuration, the measurement device 1 according to the present embodiment, even in the environment in which each parameter data of the loss of the external connection cable, the azimuth angle (θ, φ) of the DUT 100, and the frequency to be measured affects the measurement accuracy, it is possible to derive accurate AI prediction result to which each parameter data is added using the AI prediction model, and it is possible to set the test signal to an testable level in an extremely short time and reliably without dropping the measurement accuracy.

In addition, in the measurement device 1 according to the present embodiment, the reception sensitivity test execution unit, in a case where a result of the pass or fail determination for measurement result of a second throughput measurement is fail, may control the output level variable setting unit to perform a level down process A, a level down process B, a level up process A, or a level up process B.

With this configuration, in the measurement device 1 according to the present embodiment, in a case where the output level of the initial step level does not reach the testable level through the dynamic control of the first output level and the step level of the test signal based on AI prediction, it is possible to immediately switch to a normal measurement routine and reliably set the output level of the test signal to the testable level.

Further, the measurement device 1 according to the present embodiment may further include an anechoic box 50 including an internal space 51, and a DUT scanning control unit 16 and a DUT scanning mechanism 56 for driving and scanning the mobile terminal to continuously vary an orientation of the mobile terminal in the internal space, in which the reception sensitivity test is performed in all orientations to be scanned by the DUT scanning control unit 16 and the DUT scanning mechanism 56 in an over the air (OTA) measurement environment in the internal space.

With this configuration, in the measurement device 1 according to the present embodiment, even in a situation in which the reception sensitivity measurement should be performed in all orientations under the OTA environment, the dynamic control of the first output level and the step level of the test signal by the AI prediction is applied, so that it is possible to set the output level of the test signal to the testable level in a short time.

Further, in order to solve the above problems, there is provided a mobile terminal testing method for performing a reception sensitivity test of a mobile terminal by using a measurement device 1, which includes a signal generator 20 that generates a test signal and a reception sensitivity test execution unit 18 that performs the reception sensitivity test of the mobile terminal by transmitting and receiving the test signal a plurality of times between the signal generator and the mobile terminal 100, and tests the mobile terminal that is a device under test, and by transmitting and receiving the test signal between the signal generator and the mobile terminal a plurality of times, the mobile terminal testing method including a setting step S1 of initially setting a test condition including a step level SL0 and an output level OL of the test signal at start of the reception sensitivity test, an AI prediction test condition change setting step S1a of holding an AI prediction model generated by performing machine learning on a relationship between parameter data and measurement result data from a measurement log file of the past reception sensitivity test using artificial intelligence, and setting an AI prediction output level SL01, which is AI-predicted in advance by the AI prediction model based on the test condition set by the setting step, as a first output level instead of the output level OL0, a pass or fail determination step S4 and S5 of performing a first throughput measurement by transmitting and receiving the test signal at the AI prediction output level and comparing a first throughput measurement result with a determination threshold value to perform pass or fail determination, and a step level change setting step of setting, instead of the step level SL0, an AI prediction step level SL01, which is AI-predicted in advance by the AI prediction model based on a measurement result of the first throughput measurement, as a step level for second and subsequent measurements.

With this configuration, in the mobile terminal testing method according to the present embodiment, the mobile terminal testing method is applied by using the measurement device 1 having the above configuration. Therefore, it is possible to quickly set the first output level of the test signal to the value close to the end of the measurement with existing non-linear control or the like by the AI prediction, and, it is possible to set the output level of the test signal to a testable level in an extremely short time by significantly reducing the number of measurements compared to methods according to the related art, such as non-linear control and CP control, and thus it is possible to efficiently perform the reception sensitivity test of the mobile terminal.

INDUSTRIAL APPLICABILITY

As described above, the mobile terminal testing device and the mobile terminal testing method according to the present invention have advantages in that it is possible to set an output level of a test signal to a testable level in a short time by reducing the number of measurements as much as possible and it is possible to efficiently perform the reception sensitivity test of the mobile terminal, and are useful for all the mobile terminal testing device and the measuring method for performing the reception sensitivity test of the mobile terminal, such as a 5G wireless terminal, having high-speed communication capability.

DESCRIPTION OF REFERENCE NUMERALS AND SIGNS

1: Measurement device (Mobile terminal testing device)
16: DUT scanning control unit (Scanning means)
18: Reception sensitivity test control unit (Reception sensitivity test execution unit, pass or fail determination means)
18a: Test condition setting unit (Setting means)
18b: AI prediction test condition change setting unit (AI prediction test condition change setting means)
18e: Output level variable setting unit (Output level setting means)
18f: Measurement result output unit (Pass or fail determination means)
20: NR system simulator (Signal generator)
50: OTA chamber (anechoic box)
51: Internal space
56: DUT scanning mechanism (scanning means)
100: DUT (Device under test, Mobile terminal)

What is claimed is:

1. A mobile terminal testing device, which includes a signal generator that generates a test signal and a reception sensitivity test execution unit that performs a reception sensitivity test of a mobile terminal by transmitting and receiving the test signal a plurality of times between the signal generator and the mobile terminal, and tests the mobile terminal that is a device under test, the mobile terminal testing device comprising:
setting means for initially setting a test condition including a step level and an output level of the test signal at start of the reception sensitivity test;
pass or fail determination means for performing a throughput measurement by transmitting and receiving the test signal under the test condition and comparing a throughput measurement result with a determination threshold value to perform pass or fail determination;
output level setting means for setting the output level according to a result of the pass or fail determination of a previous throughput measurement in a case where the result of the pass or fail determination is fail; and
AI prediction test condition change setting means for holding an AI prediction model generated by performing machine learning on a relationship between parameter data and measurement result data from a measurement log file of the past reception sensitivity test using artificial intelligence, and setting an AI prediction output level, which is AI-predicted in advance by the AI prediction model based on the test condition set by the setting means, as a first output level instead of the output level.

2. The mobile terminal testing device according to claim 1, wherein
the AI prediction test condition change setting means sets, instead of the step level, an AI prediction step level, which is AI-predicted in advance by the AI prediction model based on a measurement result of a first throughput measurement performed by transmitting and receiving the test signal at the AI prediction output level, as a step level for second and subsequent measurements.

3. The mobile terminal testing device according to claim 2, wherein
the AI prediction test condition change setting means, in a case where a result of the pass or fail determination for the measurement result of the first throughput measurement is fail, thereafter, performs an update process of the output level for a next measurement using the AI prediction step level until a second throughput measurement.

4. The mobile terminal testing device according to claim 1, wherein
the AI prediction test condition change setting means designates loss of an external connection cable, an azimuth angle (θ, φ) of the mobile terminal, and a frequency to be measured as the parameter data, and holds the AI prediction model generated by performing the machine learning on the relationship between the parameter data and the measurement result data.

5. The mobile terminal testing device according to claim 2, wherein
the reception sensitivity test execution unit, in a case where a result of the pass or fail determination for a measurement result of a second throughput measurement is fail, controls the output level setting means to perform a level down process A, a level down process B, a level up process A, or a level up process B.

6. The mobile terminal testing device according to claim 1, further comprising:
an anechoic box including an internal space; and
scanning means for driving and scanning the mobile terminal so as to continuously vary an orientation of the mobile terminal in the internal space, wherein
the reception sensitivity test is performed in all orientations to be scanned by the scanning means in an over the air (OTA) measurement environment in the internal space.

7. A mobile terminal testing method for performing a reception sensitivity test of a mobile terminal by using a mobile terminal testing device, which includes a signal generator that generates a test signal and a reception sensitivity test execution unit that performs the reception sensitivity test of the mobile terminal by transmitting and receiving the test signal a plurality of times between the signal generator and the mobile terminal, and tests the mobile terminal that is a device under test, and by transmitting and receiving the test signal between the signal generator and the mobile terminal a plurality of times, the mobile terminal testing method comprising:
a setting step of initially setting a test condition including a step level and an output level of the test signal at start of the reception sensitivity test;
an AI prediction test condition change setting step of holding an AI prediction model generated by performing machine learning on a relationship between parameter data and measurement result data from a measurement log file of the past reception sensitivity test using artificial intelligence, and setting an AI prediction output level, which is AI-predicted in advance by the AI prediction model based on the test condition set by the setting step, as a first output level instead of the output level;

a pass or fail determination step of performing a first throughput measurement by transmitting and receiving the test signal at the AI prediction output level and comparing a first throughput measurement result with a determination threshold value to perform pass or fail determination; and a step level change setting step of setting, instead of the step level, an AI prediction step level, which is AI-predicted in advance by the AI prediction model based on a measurement result of the first throughput measurement, as a step level for second and subsequent measurements.

\* \* \* \* \*